United States Patent
Miwa et al.

(10) Patent No.: US 10,057,448 B2
(45) Date of Patent: Aug. 21, 2018

(54) PRINT DATA GENERATION APPARATUS, PRINT DATA GENERATION METHOD AND NON-TRANSITORY COMPUTER-READABLE MEDIUM

(71) Applicant: BROTHER KOGYO KABUSHIKI KAISHA, Nagoya-shi, Aichi-ken (JP)

(72) Inventors: Hitomi Miwa, Nagoya (JP); Takeshi Watanabe, Nagoya (JP); Yoshihisa Kayanaka, Kuwana (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 40 days.

(21) Appl. No.: 15/097,456

(22) Filed: Apr. 13, 2016

(65) Prior Publication Data
US 2016/0303848 A1  Oct. 20, 2016

(30) Foreign Application Priority Data
Apr. 15, 2015 (JP) ................. 2015-083544

(51) Int. Cl.
| | |
|---|---|
| B41J 2/045 | (2006.01) |
| H04N 1/034 | (2006.01) |
| H04N 1/04 | (2006.01) |
| B41J 2/21 | (2006.01) |

(52) U.S. Cl.
CPC ............ *H04N 1/034* (2013.01); *B41J 2/2132* (2013.01)

(58) Field of Classification Search
CPC .................................................... B41J 3/4073
See application file for complete search history.

(56) References Cited

U.S. PATENT DOCUMENTS

| | | | | |
|---|---|---|---|---|
| 5,714,990 A * | 2/1998 | Courtney | ................ | B41J 2/17 347/102 |
| 5,838,354 A * | 11/1998 | Yamada | .................... | B41J 2/01 242/530.4 |
| 6,012,796 A * | 1/2000 | Tanaka | ................. | G06K 15/102 347/15 |
| 6,513,906 B1 * | 2/2003 | Tanaka | .................... | B41J 19/16 347/41 |
| 6,755,518 B2 * | 6/2004 | Codos | ....................... | B41J 3/28 345/101 |

(Continued)

FOREIGN PATENT DOCUMENTS

JP     2005-169736 A     6/2005

*Primary Examiner* — John P Zimmermann

(74) *Attorney, Agent, or Firm* — K&L Gates LLP

(57) ABSTRACT

Original print data includes ejection information to form a plurality of pixel arrays each including pixels arranged in a first direction. A plurality of divided print data are generated based on the ejection information included in the original print data. At least one of divided print data includes the ejection information to form a first pixel array and a second pixel array, not a third pixel array. The second pixel array is included in the plurality of pixel arrays aligned in a second direction corresponding to the original print data and is not adjacent to the first pixel array in the second direction. The third pixel array is included in the plurality of pixel arrays aligned in the second direction corresponding to the original print data, and is between the first pixel array and the second pixel array in the second direction and adjacent to the first pixel array.

18 Claims, 12 Drawing Sheets

(56) References Cited

U.S. PATENT DOCUMENTS

| | | | | |
|---|---|---|---|---|
| 8,322,840 B2* | 12/2012 | Okamori | ............... | B41J 11/002 156/277 |
| 8,449,104 B2* | 5/2013 | Okazawa | ............ | B41J 11/0095 100/29 |
| 2002/0122094 A1* | 9/2002 | Haflinger | ................. | B41J 2/15 347/41 |
| 2002/0186277 A1* | 12/2002 | Kanda | ................... | B41J 2/2132 347/43 |
| 2003/0202045 A1* | 10/2003 | Torgerson | ................. | B41J 2/15 347/43 |
| 2005/0002718 A1* | 1/2005 | Winter | .............. | B65H 23/0204 400/579 |
| 2005/0024464 A1* | 2/2005 | Takagi | .................. | B41J 11/007 347/104 |
| 2005/0140712 A1 | 6/2005 | Kondo et al. | | |
| 2012/0274683 A1* | 11/2012 | Yamasaki | ............. | B41J 3/4073 347/2 |
| 2015/0007841 A1* | 1/2015 | Yamasaki | ............. | A45D 29/00 132/73.5 |

* cited by examiner

| PRINT AREA [cm²] | DIVISION CONDITION | | TOTAL DIVIDED VAL | STBY TIME PERIOD |
| --- | --- | --- | --- | --- |
| | 1ST DIVISION | 2ND DIVISION | | |
| <25 | 0.25 | 1 | 1.25 | SET |
| ≧25 AND <60 | 0.5 | 0.5 | 1 | SET |
| ≧60 AND <120 | 0.25 | 1 | 1.25 | NOT SET |
| ≧120 | 0.5 | 0.5 | 1 | NOT SET |

| SCAN TIME PERIOD [SEC] | DIVISION CONDITION | | TOTAL DIVIDED VALUE | STBY TIME PERIOD |
|---|---|---|---|---|
| | 1ST DIVISION | 2ND DIVISION | | |
| <15 | 0.25 | 1 | 1.25 | SET |
| ≧15 AND <30 | 0.5 | 0.5 | 1 | SET |
| ≧30 AND <50 | 0.25 | 1 | 1.25 | NOT SET |
| ≧50 | 0.5 | 0.5 | 1 | NOT SET |

PRINT DATA GENERATION APPARATUS, PRINT DATA GENERATION METHOD AND NON-TRANSITORY COMPUTER-READABLE MEDIUM

CROSS-REFERENCE TO RELATED APPLICATION

This application claims priority to Japanese Patent Application No. 2015-083544 filed on Apr. 15, 2015, the disclosure of which is herein incorporated by reference in its entirety.

BACKGROUND

The present disclosure relates to a print data generation apparatus, a print data generation method and a non-transitory computer-readable medium.

A print device performs printing on a record medium by ejecting ink from an ejection head provided with a plurality of nozzles while moving the ejection head relative to the record medium. For example, the print device ejects ink while moving the ejection head relative to the record medium in one direction of a main scanning direction, and forms a pixel array on the record medium. After the print device has moved the record medium relative to the ejection head in a sub-scanning direction, the print device ejects ink while moving the ejection head relative to the record medium in another direction of the main scanning direction, thus forming the next pixel array on the record medium. The print device forms a plurality of pixel arrays by repeating the above-described operations, and prints an image on the record medium. Hereinafter, in order to simplify the description, the movement of the ejection head relative to the record medium is simply expressed as "the movement of the ejection head."

SUMMARY

When the print device forms a plurality of pixel arrays aligned in the sub-scanning direction, immediately after the print device has formed a pixel array by the movement of the ejection head in the one direction, the print device forms a pixel array by the movement of the ejection head in the other direction. Adjacent in the sub-scanning direction to a pixel formed by ink ejected at the beginning of the movement of the ejection head in the one direction, a pixel formed by ink ejected just before the end of the movement of the ejection head in the other direction is disposed after a time period corresponding to the reciprocating movement of the ejection head has elapsed. On the other hand, adjacent in the sub-scanning direction to a pixel formed by ink ejected just before the end of the movement of the ejection head in the one direction, a pixel formed by ink ejected at the beginning of the movement of the ejection head in the other direction is disposed quickly. More specifically, in the two pixel arrays adjacent to each other in the sub-scanning direction, when comparing the earlier formed pixel array and the subsequently formed pixel array, a difference is generated in a state of dryness of the ink depending on positions in the main scanning direction. The ink ejected onto a subsequent pixel that is adjacent in the sub-scanning direction to the preceding pixel whose ink has dried to some extent is unlikely to permeate into the record medium in a thickness direction of the record medium, due to a film formed by the dried ink, in a position where the preceding pixel is formed. Therefore, the ink does not spread significantly on the film and dries out. Thus, a decrease in color density is unlikely to occur in a region, which is adjacent to the preceding pixel in the sub-scanning direction, of the subsequent pixel. On the other hand, the ink in the preceding pixel whose ink has not dried and the ink ejected onto the subsequent pixel that is adjacent in the sub-scanning direction both dry out while permeating into the record medium and spreading. Therefore, the color density tends to decrease. For that reason, the print device may not sufficiently represent the color density or may cause banding. The banding is a stripe-like boundary caused by a density difference, and occurs between the pixel arrays formed by ink.

To address this, a print device is proposed that achieves improvement in print quality by increasing an ink ejection amount or adopting a multi-pass method. When the ink ejection amount is increased, the color density is secured. The multi-pass method is a method for completing printing by scanning the ejection head a plurality of times in the same region on the record medium. In the multi-pass method, the print device respectively ejects the inks that form pixels adjacent to each other in the sub-scanning direction from different ejection openings of the ejection head. In this case, variations due to precision errors occur in ink ejection positions on the record medium, and the print device can thus suppress the banding.

Various embodiments of the general principles described herein provide an apparatus and a method capable of further improving print quality.

Embodiments herein provide a print data generation apparatus configured to generate print data to be used in a print device. The print device is configured to print a print image in a predetermined original region on a record medium by causing an ejection head, which has a plurality of ejection openings to eject a liquid droplet, to perform scanning relative to the record medium in a first direction and a second direction intersecting the first direction. The print data generation apparatus includes a processor and a memory. The memory stores computer-readable instructions. When executed by the processor, the computer-readable instructions perform processes including acquiring original print data. The original print data includes ejection information corresponding to the original region. The ejection information is information to cause the liquid droplet to be ejected from each of the plurality of ejection openings in order to form each of a plurality of pixels forming the print image. The original print data includes the ejection information to form a plurality of pixel arrays aligned in the second direction. Each of the pixel arrays is an array of the pixels arranged in the first direction. The processes also include generating a plurality of divided print data based on the ejection information included in the acquired original print data. The plurality of divided print data are data to print the print image by performing a plurality of a set of scans in the first direction and the second direction. Each set of scans in the first direction and the second direction corresponds to a whole of the original region. At least one of the plurality of divided print data includes the ejection information to form a first pixel array and a second pixel array, and does not include the ejection information to form a third pixel array. The second pixel array is included in the plurality of pixel arrays aligned in the second direction corresponding to the original print data, and is the pixel array not adjacent to the first pixel array in the second direction. The third pixel array is included in the plurality of pixel arrays aligned in the second direction corresponding to the original print data, and is the pixel array between the first pixel array and the second pixel array in the second direction and adjacent to the first pixel array.

Embodiments herein also provide a print data generation method capable of generating print data to be used in the print device. The print data generation method includes a step of acquiring original print data. The original print data includes ejection information corresponding to the original region. The ejection information is information to cause the liquid droplet to be ejected from each of the plurality of ejection openings in order to form each of a plurality of pixels forming the print image. The original print data includes the ejection information to form a plurality of pixel arrays aligned in the second direction. Each of the pixel arrays is an array of the pixels arranged in the first direction. The method also includes a step of generating a plurality of divided print data based on the ejection information included in the acquired original print data. The plurality of divided print data are data to print the print image by performing a plurality of a set of scans in the first direction and the second direction. Each set of scans in the first direction and the second direction corresponds to a whole of the original region. At least one of the plurality of divided print data includes the ejection information to form a first pixel array and a second pixel array, and does not include the ejection information to form a third pixel array. The second pixel array is included in the plurality of pixel arrays aligned in the second direction corresponding to the original print data, and is the pixel array not adjacent to the first pixel array in the second direction. The third pixel array is included in the plurality of pixel arrays aligned in the second direction corresponding to the original print data, and is the pixel array between the first pixel array and the second pixel array in the second direction and adjacent to the first pixel array.

Embodiments herein also provide a non-transitory computer-readable medium storing computer-readable instructions. When executed by the processor provided in the print data generation apparatus, the computer-readable instructions perform processes including acquiring original print data. The original print data includes ejection information corresponding to the original region. The ejection information is information to cause the liquid droplet to be ejected from each of the plurality of ejection openings in order to form each of a plurality of pixels forming the print image. The original print data includes the ejection information to form a plurality of pixel arrays aligned in the second direction. Each of the pixel arrays is an array of the pixels arranged in the first direction. The processes also include generating a plurality of divided print data based on the ejection information included in the acquired original print data. The plurality of divided print data are data to print the print image by performing a plurality of a set of scans in the first direction and the second direction. Each set of scans in the first direction and the second direction corresponds to a whole of the original region. At least one of the plurality of divided print data includes the ejection information to form a first pixel array and a second pixel array, and does not include the ejection information to form a third pixel array. The second pixel array is included in the plurality of pixel arrays aligned in the second direction corresponding to the original print data, and is the pixel array not adjacent to the first pixel array in the second direction. The third pixel array is included in the plurality of pixel arrays aligned in the second direction corresponding to the original print data, and is the pixel array between the first pixel array and the second pixel array in the second direction and adjacent to the first pixel array.

BRIEF DESCRIPTION OF THE DRAWINGS

Embodiments will be described below in detail with reference to the accompanying drawings in which:

FIG. 9 is a conceptual diagram of a division condition table used to determine division condition in accordance with a print area;

DETAILED DESCRIPTION

Figure 1:
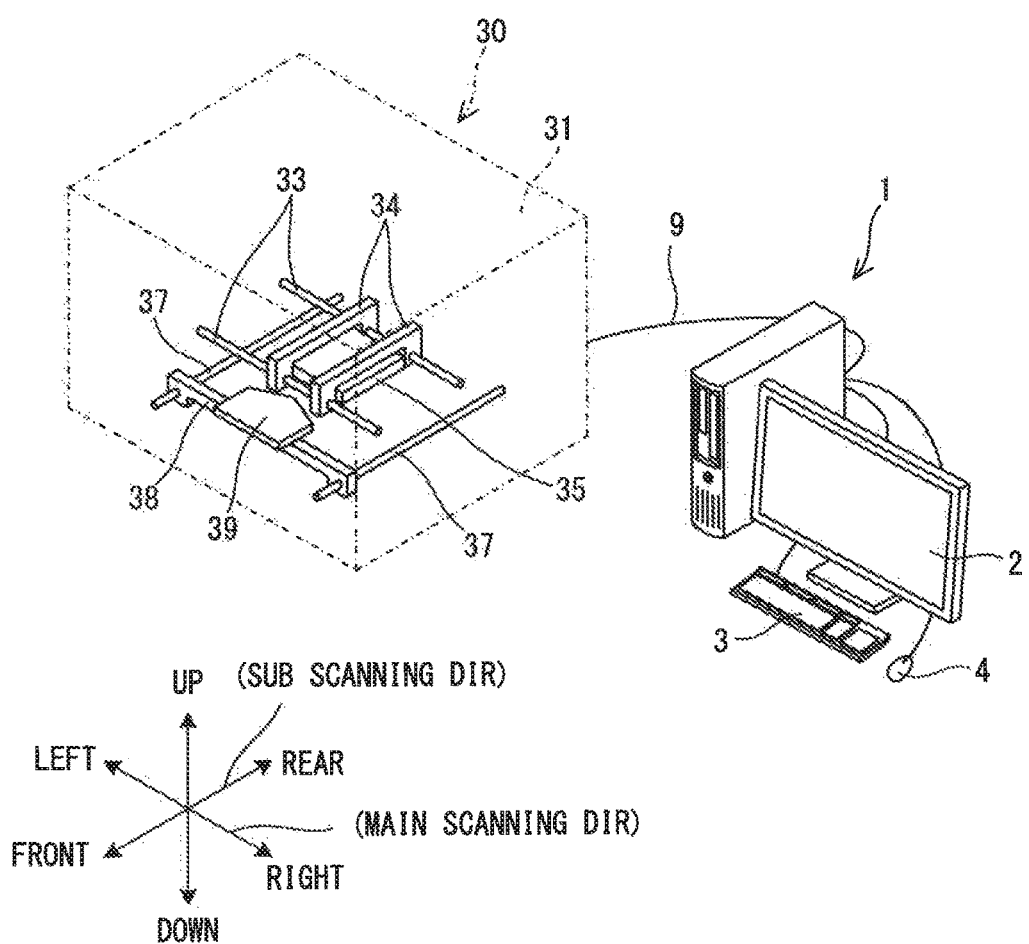
FIG. 1 is a perspective view showing a schematic configuration of a print device and a personal computer (PC)

A print device 30, which is an example of the present disclosure, will be described with reference to FIG. 1. The lower left side, the upper right side, the lower right side, the upper left side, the upper side and the lower side of FIG. 1 respectively correspond to the front side, the rear side, the right side, the left side, the upper side and the lower side of the print device 30.

The print device 30 is a known inkjet printer for fabric. The print device 30 causes ejection heads 35 to perform scanning, and thereby prints an image on fabric, which is a record medium. The print device 30 is connected to a personal computer (hereinafter referred to as a "PC") 1 via a cable 9. The PC 1 generates print data to cause the print device 30 to perform print processing on fabric. The print data includes ejection information. The ejection information is information used to associate ejection and non-ejection of ink droplets to form pixels within a predetermined region on a fabric with each of a plurality of ejection openings 36 (refer to FIG. 2). The print data is transmitted from the PC 1 to the print device 30. The print device 30 processes the print data acquired from the PC 1, and generates divided print data. The divided print data is print data to divide the print processing into a plurality of cycles. Hereinafter, the print data generated by the PC 1 is referred to as original print data.

The print device 30 is provided with a pair of guide rails 37 extending in the front-rear direction, on a lower portion inside a housing 31. The pair of guide rails 37 support a platen support 38 such that the platen support 38 can move in the front-rear direction. A platen 39 is fixed to the center in the left-right direction of an upper surface of the platen support 38. The platen 39 is a plate body. A fabric that is a record medium, such as a T-shirt, is placed on the upper surface of the platen 39. The platen support 38 is conveyed in a sub-scanning direction by a sub-scanning mechanism (not shown in the drawings). The sub-scanning direction is the front rear direction in which the fabric is conveyed by the platen 39. The sub-scanning mechanism includes a sub-scanning motor 47 (refer to FIG. 3) and a belt (not shown in the drawings).

The print device 30 is provided with a pair of guide rails 33 extending in the left-right direction, inside the housing 31 and above the platen 39. The pair of guide rails 33 support a carriage 34 such that the carriage 34 can move in the left-right direction. A plurality (for example, eight) of the ejection heads 35 are mounted on a lower portion of the carriage 34. The carriage 34 provided with the plurality of ejection heads 35 is conveyed by a main scanning mechanism (not shown in the drawings) in a main scanning direction (the left-right direction) orthogonal to the sub-scanning direction. The main scanning mechanism includes a main scanning motor 46 (refer to FIG. 3) and a belt (not shown in the drawings).

Figure 2:
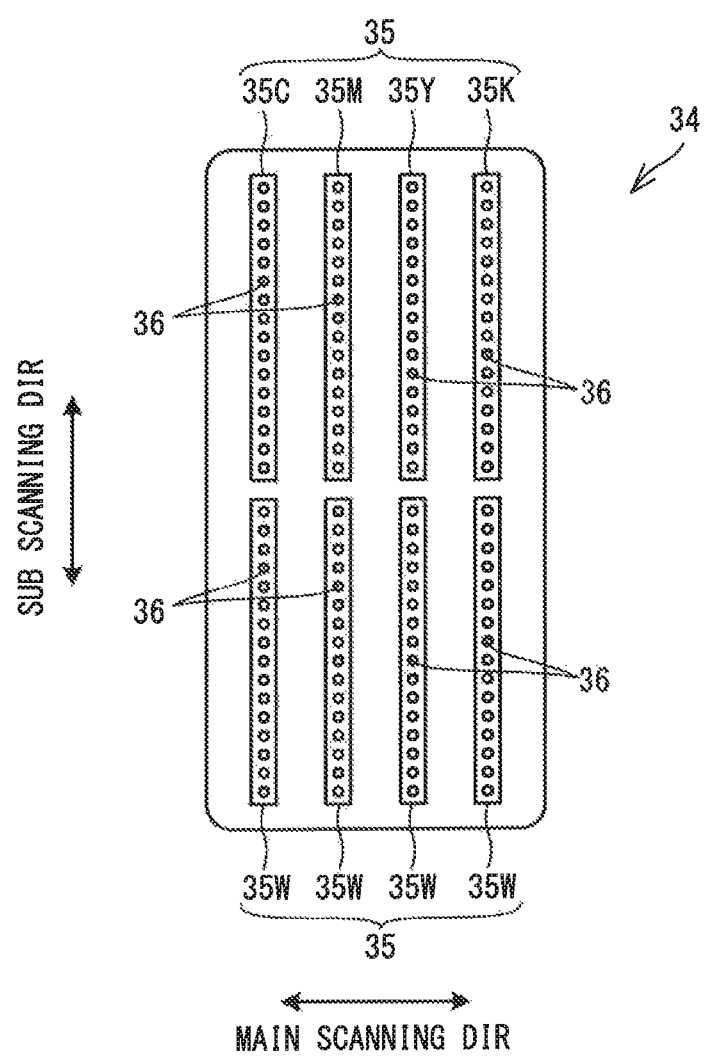
FIG. 2 is a bottom view showing a schematic configuration of a carriage.

As shown in FIG. 2, four ejection heads 35W and ejection heads 35C, 35M, 35Y and 35K are mounted on the carriage 34. For explanatory convenience, in the description below, the four ejection heads 35W and the ejection heads 35C, 35M, 35Y and 35K are also referred to as the ejection heads 35, respectively. A bottom surface of each of the ejection heads 35 is provided with a plurality (for example, 128) of the ejection openings 36. In order to simplify the drawing, FIG. 2 shows the ejection openings 36 of a number smaller than the actual number. Each of the ejection openings 36 can eject ink. The ink supplied to each of the ejection heads 35 from an ink cartridge mounted in the print device 30 is ejected downward from each of the ejection openings 36 by driving of a piezoelectric element or a heating element provided in an ejection channel.

The four ejection heads 35W are aligned in the main scanning direction such that an alignment direction of the ejection openings 36 of each of them is along the sub-scanning direction, and are mounted on the carriage 34. The ejection heads 35W eject a white ink from the ejection openings 36 of each of them. In a similar manner, the ejection heads 35C, 35M, 35Y and 35K are aligned in the main scanning direction such that the alignment direction of the ejection openings 36 of each of them is along the sub-scanning direction, and are mounted on the carriage 34. The ejection heads 35C, 35M, 35Y and 35K eject color inks from the ejection openings 36 of each of them. The ejection head 35C ejects a cyan ink from the ejection openings 36. The ejection head 35M ejects a magenta ink from the ejection openings 36. The ejection head 35Y ejects a yellow ink from the ejection openings 36. The ejection head 35K ejects a black ink from the ejection openings 36. The four ejection heads 35W that eject the white ink, and the ejection heads 35C, 35M, 35Y and 35K that eject the color inks are disposed so as to be separated from each other in the sub-scanning direction.

The print device 30 forms pixel arrays each extending in the main scanning direction by causing the ink to be ejected while causing the ejection heads 35 to perform scanning in the main scanning direction. After the formation of pixel arrays by one cycle of (one pass of) scanning is complete, the print device 30 moves the platen 39 in the sub-scanning direction and once again forms pixel arrays by one cycle of scanning. The print device 30 forms a plurality of pixel arrays by repeatedly performing the above-described operations in accordance with the print data, and prints, on the fabric, an image in which the pixel arrays are aligned in both the main scanning direction and the sub-scanning direction. There are cases in which the alignment of the pixel arrays each extending in the main scanning direction is referred to as "rows" and the alignment of the pixel arrays each extending in the sub-scanning direction is referred to as "columns."

The present disclosure can also be applied to a case in which the printing is performed by moving the platen 39 without moving the ejection heads 35. In summary, it is sufficient if the print device 30 allows relative movement between the ejection heads 35 and the platen 39.

Figure 3:
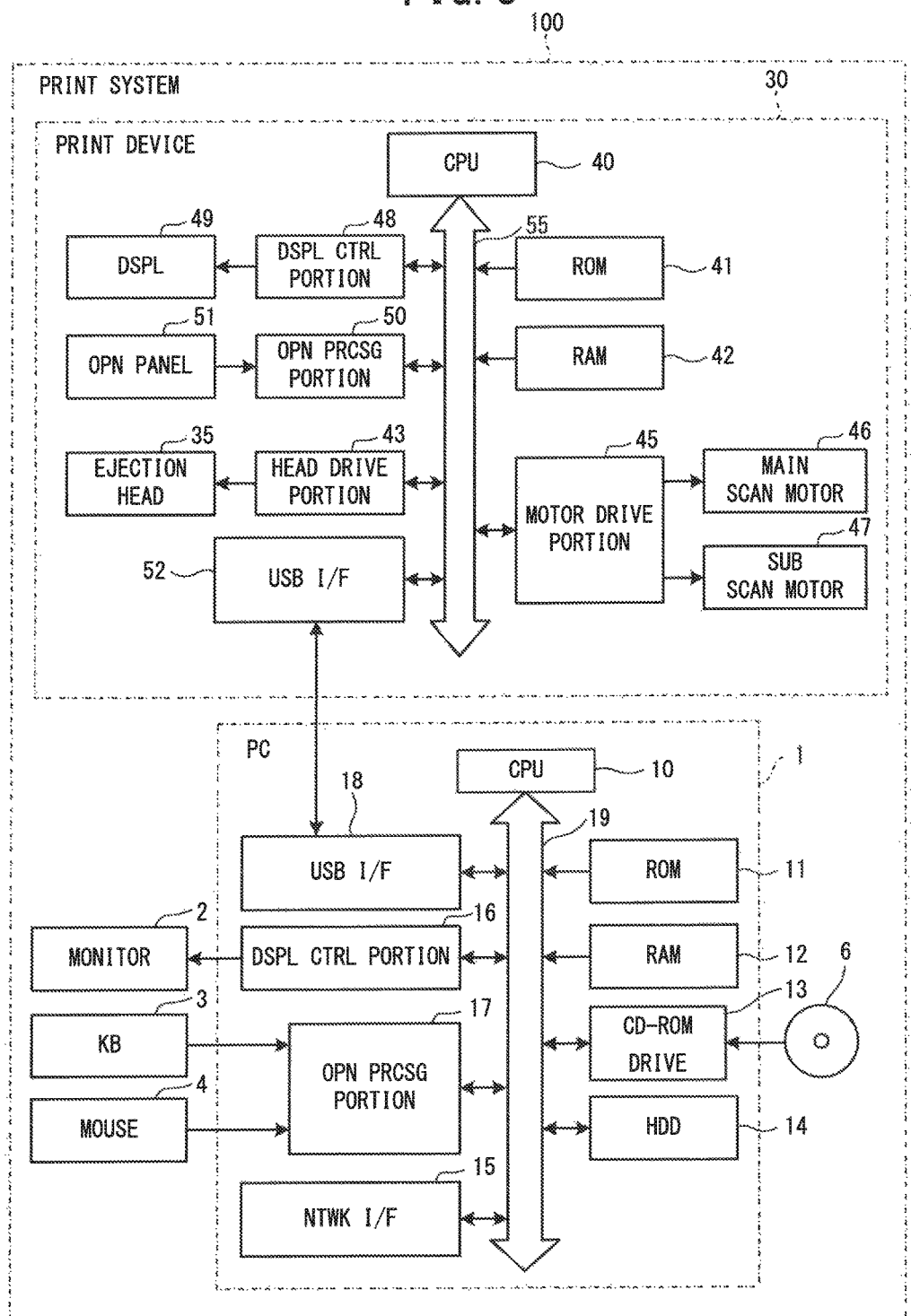
FIG. 3 is a block diagram showing an electrical configuration of the print device and the PC.

An electrical configuration of the print device 30 and the PC 1 will be described with reference to FIG. 3. A print system 100 includes the PC 1 and the print device 30. The print device 30 is provided with a CPU 40 that controls the print device 30. A ROM 41, a RAM 42, a head drive portion 43, a motor drive portion 45, a display control portion 48, an operation processing portion 50 and a USB interface 52 are connected to the CPU 40 via a bus 55.

In addition to a control program to control operations of the print device 30, a main program (which will be described later), initial values and the like are stored in the ROM 41. The RAM 42 temporarily stores various data. The head drive portion 43 is connected to the ejection heads 35 that eject the ink, and drives the piezoelectric element or the heating element provided in each of the ejection channels of the ejection heads 35. The motor drive portion 45 drives the main scanning motor 46 and the sub-scanning motor 47. The main scanning motor 46 causes the ejection heads 35 to move in the main scanning direction. The sub-scanning motor 47 causes the platen 39 to move in the sub-scanning direction. The display control portion 48 controls display of a display 49 in accordance with a command by the CPU 40. Various screens and messages etc. relating to the operations of the print device 30 are displayed on the display 49. The operation processing portion 50 receives an operation input on an operation panel 51. A user can input various types of information and commands via the operation panel 51. The USB interface 52 connects the print device 30 to an external device, such as the PC 1.

The PC 1 is provided with a CPU 10 that controls the PC 1. A ROM 11, a RAM 12, a CD-ROM drive 13, a hard disk drive (hereinafter referred to as an "HDD") 14, a display control portion 16, an operation processing portion 17, a USB interface 18 and a network interface 15 are connected to the CPU 10 via a bus 19.

Programs, such as a BIOS, to be executed by the CPU 10 are stored in the ROM 11. The RAM 12 temporarily stores various data. A CD-ROM 6, which is a data storage medium, is inserted into the CD-ROM drive 13. Data stored in the CD-ROM 6 is read out by the CD-ROM drive 13. The PC 1 acquires a program (a printer driver) etc. from the CD-ROM 6 or via the Internet or the like to generate the original print data and causes the HDD 14 to store the program etc. The HDD 14 is a non-volatile storage device, and stores the printer driver, various tables and the like. The display control portion 16 controls display of a monitor 2. The operation processing portion 17 is connected to a keyboard 3 and a mouse 4 used by the user to perform an operation input, and receives the operation input. The USB interface 18 connects the PC 1 to an external device, such as the print device 30. The network interface 15 connects the PC 1 to an external network, such as the Internet.

The print device 30 acquires the original print data from the PC 1 and generates the divided print data in accordance with the main program that will be described later. The print device 30 performs print processing based on the generated divided print data or the original print data, and prints an image on the fabric.

Figure 4:
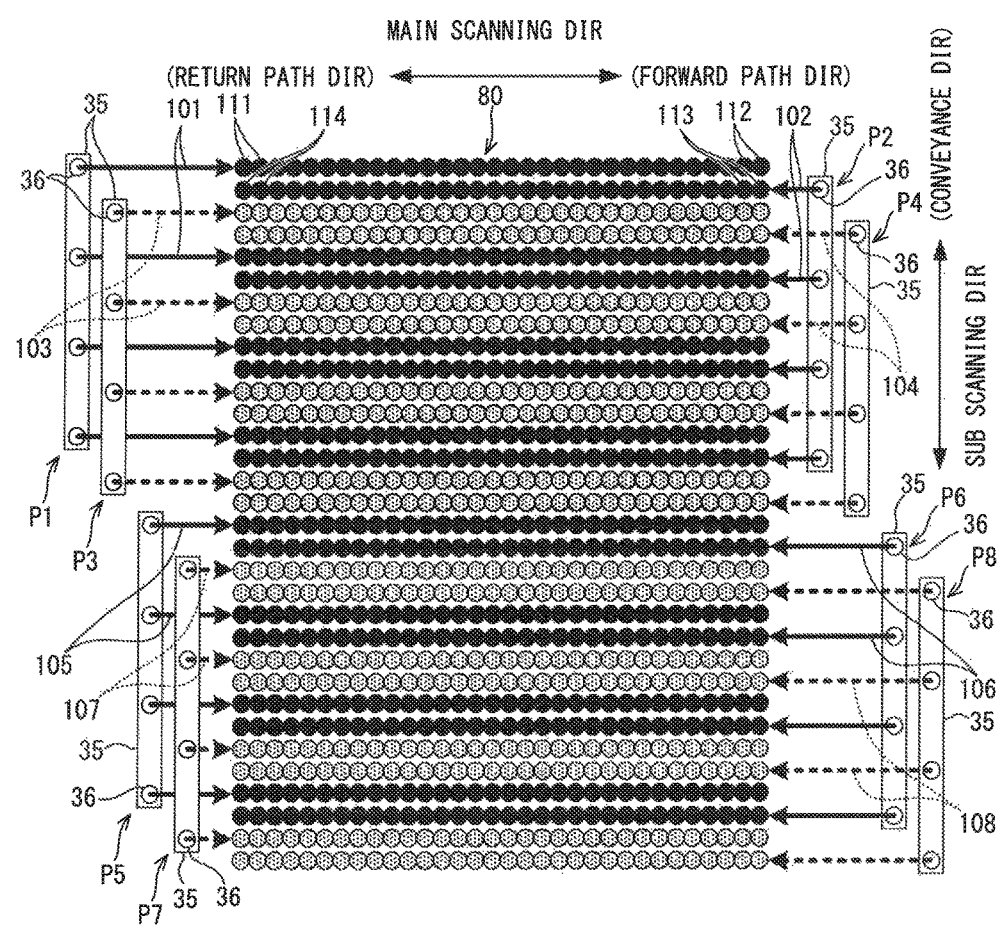
FIG. 4 is an explanatory diagram of normal print processing.

Normal print processing based on the original print data will be described with reference to FIG. 4. In the description below using FIG. 4, in order to simplify the drawing and the description, a virtual example is used in which the number of the provided ejection openings 36 of the ejection head 35 is smaller and the resolution of the print processing is lower in comparison to the actual print device 30. This also applies to an explanation to be described later using FIG. 5.

Each of the ejection heads 35 has the plurality of ejection openings 36. In this virtual example, the ejection openings 36 are formed by a four-pixel pitch in the sub-scanning direction. In one cycle of scanning, the ejection heads 35 can simultaneously form a plurality of pixel arrays at a four-pixel pitch (the first row, the fifth row, the ninth row and the thirteenth row based on the print data, in the example shown in FIG. 4) in the sub-scanning direction, using the ink discharged from each of the ejection openings 36.

In accordance with the print data, the print device 30 ejects the ink from the ejection openings 36 while moving the ejection heads 35 in a forward path direction, which is one direction of the main scanning direction, and forms first pixel arrays 101 that correspond to pixel arrays of the first row, the fifth row, the ninth row and the thirteenth row in the original print data (P1). When the formation of the first pixel arrays 101 is complete, the print device 30 moves the platen 39 by one pixel in a conveyance direction, which is one direction of the sub-scanning direction. The print device 30 ejects the ink from the ejection openings 36 in accordance with the print data while moving the ejection heads 35 in a return path direction that is opposite to the forward path direction, and forms second pixel arrays 102 that correspond to pixel arrays of the second row, the sixth row, the tenth row and the fourteenth row in the original print data (P2). The second pixel arrays 102 are pixel arrays each adjacent to the corresponding first pixel array 101 in the sub-scanning direction. The print device 30 moves the platen 39 by one pixel in the conveyance direction, and repeats operations similar to those described above, thus forming third pixel arrays 103 on the forward path (P3) and forming fourth pixel arrays 104 on the return path (P4). The third pixel arrays 103 correspond to pixel arrays of the third row, the seventh row, the eleventh row and the fifteenth row in the original print data, and are pixel arrays each adjacent to the corresponding second pixel array 102 in the sub-scanning direction. The fourth pixel arrays 104 correspond to pixel arrays of the fourth row, the eighth row, the twelfth row and the sixteenth row in the original print data, and are pixel arrays each adjacent to the corresponding third pixel array 103 in the sub-scanning direction. A gap between two of the first pixel arrays 101 which are aligned at the four-pixel pitch in the sub-scanning direction and which are separated from each other is filled up by the second pixel array 102, the third pixel array 103 and the fourth pixel array 104.

The print device 30 moves the platen 39 in the conveyance direction by a length of the ejection head 35, and forms fifth pixel arrays 105 on the forward path in accordance with the print data in a similar manner to that described above (P5), and forms sixth pixel arrays 106 on the return path (P6). The fifth pixel arrays 105 correspond to pixel arrays of the seventeenth row, the twenty-first row, the twenty-fifth row and the twenty-ninth row in the original print data, and are pixel arrays each adjacent to the corresponding fourth pixel array 104 in the sub-scanning direction. The sixth pixel arrays 106 correspond to pixel arrays of the eighteenth row, the twenty-second row, the twenty-sixth row and the thirtieth row in the original print data, and are pixel arrays each adjacent to the corresponding fifth pixel array 105 in the sub-scanning direction. The print device 30 moves the platen 39 by one pixel in the conveyance direction, and repeats operations similar to those described above, thus forming seventh pixel arrays 107 on the forward path (P7) and forming eighth pixel arrays 108 on the return path (P8). The seventh pixel arrays 107 correspond to pixel arrays of the nineteenth row, the twenty-third row, the twenty-seventh row and the thirty-first row in the original print data, and are pixel arrays each adjacent to the corresponding sixth pixel array 106 in the sub-scanning direction. The eighth pixel arrays 108 correspond to pixel arrays of the twentieth row, the twenty-fourth row, the twenty-eighth row and the thirty-second row in the original print data, and are pixel arrays each adjacent to the corresponding seventh pixel array 107 in the sub-scanning direction. A gap between two of the fifth pixel arrays 105 which are aligned at the four-pixel pitch in the sub-scanning direction and which are separated from each other is filled up by the sixth pixel array 106, the seventh pixel array 107 and the eighth pixel array 108.

The print device 30 repeatedly performs the above-described operations, and sequentially forms pixel arrays that are adjacent to each other in the sub-scanning direction. An image etc. formed by a plurality of pixel arrays is printed on the fabric by the print processing based on the original print data. In the description below, a predetermined region on the fabric in which an image is formed based on the original print data is referred to as an original region 80.

A state of the ink ejected onto the fabric will be described taking an example in which solid printing is performed on the fabric. An ink 111 ejected at the beginning of the formation of the first pixel arrays 101 permeates into the fabric, and gradually dries out while spreading in the thickness direction and a plane direction of the fabric. In contrast to the ink 111 ejected at the beginning of the formation of the first pixel arrays 101, an ink 112 ejected just before the end of the formation of the first pixel arrays 101 remains in a wet state and barely permeates into the fabric. When the formation of the second pixel arrays 102 is started, an ink 113 is ejected onto a position that has moved by one pixel in the sub-scanning direction with respect to the ink 112 ejected just before the end of the formation of the first pixel arrays 101. At the end of the formation of the second pixel arrays 102, an ink 114 is ejected onto a position that has moved by one pixel in the sub-scanning direction with respect to the ink 111 ejected at the beginning of the formation of the first pixel arrays 101. The degree of permeation into the fabric and the degree of drying out are substantially the same between the ink 113 ejected at the beginning of the formation of the second pixel arrays 102 and the ink 112 ejected just before the end of the formation of the first pixel arrays 101. Both of the inks gradually dry out while permeating into the fabric and spreading. Therefore, a density difference is unlikely to occur between the pixels respectively formed by the inks 112 and 113.

In contrast to this, the degree of permeation into the fabric and the degree of drying out are different between the ink 111 ejected at the beginning of the formation of the first pixel arrays 101 and the ink 114 ejected just before the end of the formation of the second pixel arrays 102. The ink 114 just before the end of the formation of the second pixel arrays 102 is ejected in a state in which the ink 111 ejected at the beginning of the formation of the first pixel arrays 101 has widely spread in the plane direction along the fabric and has almost dried out. Therefore, the ink 114 ejected just before the end of the formation of the second pixel arrays 102 is disposed on the fabric in such a manner that a part of the ink 114 is placed on a film formed by the drying of the ink 111 ejected at the beginning of the formation of the first pixel arrays 101. The part of the ink 114 that is placed on the film of the ink 111 is unlikely to permeate into the fabric in the thickness direction, and dries out on the film of the ink 111. A part of the ink 114 that is not placed on the film of the ink 111 permeates into the fabric, and dries out while spreading. A density difference thus occurs between a section where the ink 111 and the ink 114 overlap with each other and a section where the ink 111 and the ink 114 do not overlap. Therefore, in an image printed by the normal print processing, so-called banding, in which boundaries between pixel arrays appear as stripes, may occur in a gradation manner along the main scanning direction.

Figure 5:
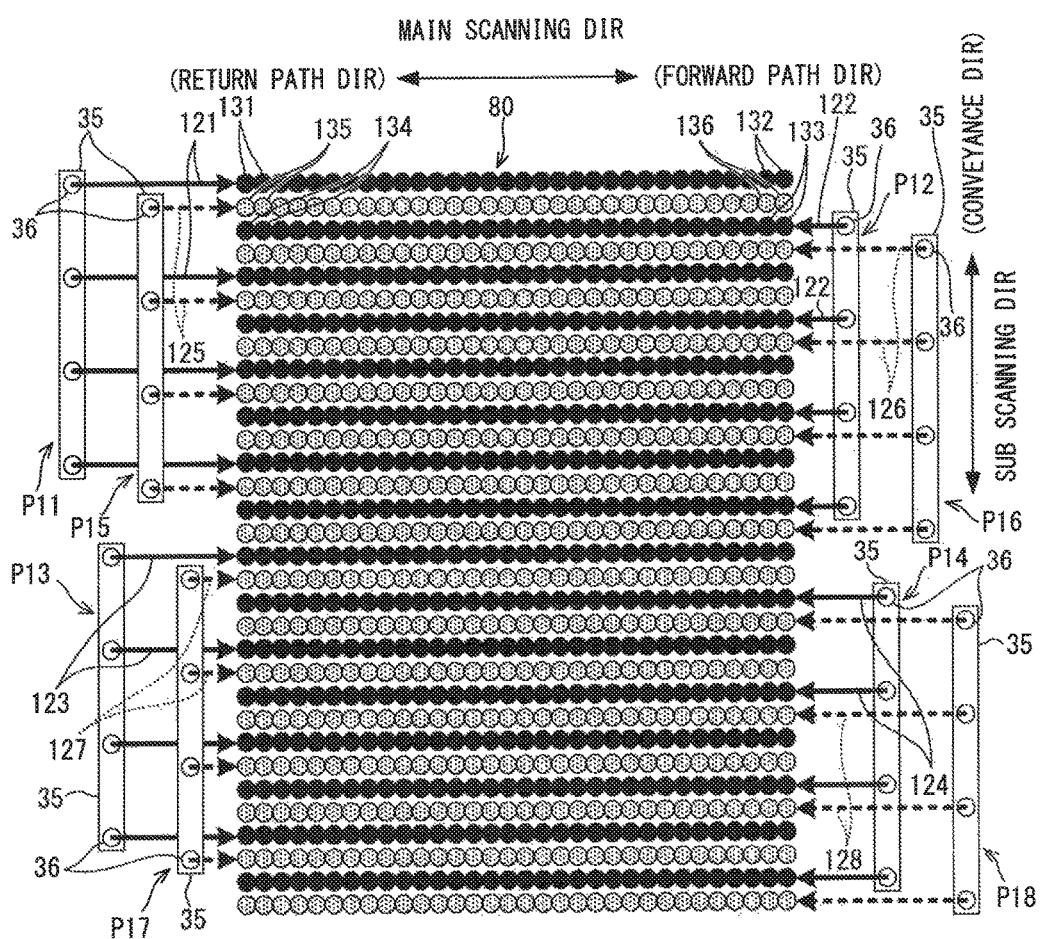
FIG. 5 is an explanatory diagram of print processing that is dividedly performed.

The print processing in a case in which printing is performed based on the divided print data will be described with reference to FIG. 5. Hereinafter, as a specific example, a case will be described in which printing is performed using first divided print data and second divided print data. The first divided print data and the second divided print data are data obtained by dividing the original print data into two parts such that their resolution in the sub-scanning direction is half the resolution of the original print data.

The divided print data is generated by dividing the ejection information included in the original print data into m pieces of information so as to satisfy the following Expression (1). In the present specific example, many pixels forming an image are considered as an alignment along a column (the sub-scanning direction) of pixel arrays, each of which is an aggregation of pixels aligned along a row (the scanning direction). Also, each of the divided print data is generated by forming a plurality of sets of the pixel arrays.

$$N = m \times n + (i - m) \quad (1)$$

In Expression (1), N is an integer representing a sequence number of a row in the pixel arrays formed based on the original print data, m is an integer representing the number of divisions, n is an integer representing a sequence number of a row in the pixel arrays formed based on the divided print data, and i is an integer (i=1 to m) representing a sequence number of a number of divisions. The pixel array of the n-th row formed based on the i-th divided print data corresponds to the pixel array of the N-th row formed based on the original print data.

When the original data is divided into the first divided print data and the second divided print data such that their resolution is half the resolution of the original print data, the number of divisions m is two. The division number of the first divided print data is set to 1 (i=1), and the division number of the second divided print data is set to 2 (i=2). The row number N of each of the pixel arrays of the original print data corresponding to the pixel arrays of the first to third rows of the first divided print data takes the following values according to Expression (1).

$$N = 2 \times 1 + (1 - 2) = 1$$

$$N = 2 \times 2 + (1 - 2) = 3$$

$$N = 2 \times 3 + (1 - 2) = 5$$

In this manner, the pixel arrays of the first to third rows (n=1, 2, 3) of the first divided print data (i=1) respectively correspond to the pixel arrays of the first, third and fifth rows (N=1, 3, 5) of the original print data. In other words, the pixel arrays of the respective rows of the first divided print data correspond to pixel arrays of odd-numbered rows of the original print data.

In a similar manner, the row number N of each of the pixel arrays of the original print data corresponding to the pixel arrays of the first to third rows of the second divided print data takes the following values according to Expression (1).

$$N = 2 \times 1 + (2 - 2) = 2$$

$$N = 2 \times 2 + (2 - 2) = 4$$

$$N = 2 \times 3 + (2 - 2) = 6$$

In this manner, the pixel arrays of the first to third rows (n=1, 2, 3) of the second divided print data (i=2) respectively correspond to the pixel arrays of the second, fourth and sixth rows (N=2, 4, 6) of the original print data. In other words, the pixel arrays of the respective rows of the second divided print data correspond to pixel arrays of even-numbered rows of the original print data.

The print device 30 ejects the ink from the ejection openings 36 in accordance with the first divided print data while moving the ejection heads 35 in the forward path direction, and forms first pixel arrays 121 that correspond to pixel arrays of the first row, the fifth row, the ninth row and the thirteenth row in an image based on the original print data (P11). After the formation of the first pixel arrays 121 is complete, the print device 30 moves the platen 39 in the conveyance direction by two pixels. The print device 30 ejects the ink from the ejection openings 36 in accordance with the first divided print data while moving the ejection heads 35 in the return path direction, and forms second pixel arrays 122 that correspond to pixel arrays of the third row, the seventh row, the eleventh row and the fifteenth row in the image based on the original print data (P12).

The print device 30 moves the platen 39 in the conveyance direction by the length of the ejection head 35. The print device 30 ejects the ink from the ejection openings 36 in accordance with the first divided print data while moving the ejection heads 35 in the forward path direction, and forms third pixel arrays 123 that correspond to pixel arrays of the seventeenth row, the twenty-first row, the twenty-fifth row and the twenty-ninth row in the image based on the original print data (P13). The print device 30 moves the platen 39 in the conveyance direction by two pixels, performs operations similar to those described above, and forms fourth pixel arrays 124 that correspond to pixel arrays of the nineteenth row, the twenty-third row, the twenty-seventh row and the thirty-first row in the image based on the original print data (P14). The first pixel arrays 121, the second pixel arrays 122, the third pixel arrays 123 and the fourth pixel arrays 124 are pixel arrays of odd-numbered rows in the image based on the original print data. The third pixel array 123 and the fourth pixel array 124 are positioned such that a gap corresponding to one row is disposed between them in the sub-scanning direction.

The print device 30 moves the platen 39 in a direction opposite to the conveyance direction in the sub-scanning direction, and thus returns the platen 39 to a print start position. The print device 30 causes the ejection heads 35 to be disposed in positions that have moved by one pixel from the first pixel arrays 121 in the conveyance direction. In accordance with the second divided print data, the print device 30 forms fifth pixel arrays 125 that correspond to pixel arrays of the second row, the sixth row, the tenth row and the fourteenth row in the original print data, while moving the ejection heads 35 in the forward path direction (P15). Each of the fifth pixel arrays 125 is formed between the first pixel array 121 and the second pixel array 122 in the sub-scanning direction. The print device 30 moves the platen 39 in the conveyance direction by two pixels corresponding to m. Then, in the same manner as that described above, in accordance with the second divided print data, the print device 30 forms sixth pixel arrays 126 that correspond to pixel arrays of the fourth row, the eighth row, the twelfth row and the sixteenth row in the original print data, while moving the ejection heads 35 in the return path direction (P16). Each of the sixth pixel arrays 126 is formed between the second pixel array 122 and the first pixel array 121 in the sub-scanning direction.

The print device 30 moves the platen 39 in the conveyance direction by the length of the ejection head 35. In accordance with the second divided print data, the print device 30 forms seventh pixel arrays 127 that correspond to pixel arrays of the eighteenth row, the twenty-second row, the twenty-sixth row and the thirtieth row in the original print data, while moving the ejection heads 35 in the forward path direction (P17). Each of the seventh pixel arrays 127 is formed between the third pixel array 123 and the fourth pixel array 124 in the sub-scanning direction. The print device 30 moves the platen 39 in the conveyance direction by two pixels. Then, in the same manner as that described above, the print device 30 forms eighth pixel arrays 128 that correspond to pixel arrays of the twentieth row, the twenty-fourth row, the twenty-eighth row and the thirty-second row in the original print data (P18). Each of the eighth pixel arrays 128 is formed between the fourth pixel array 124 and the third pixel array 123 in the sub-scanning direction. The fifth pixel arrays 125, the sixth pixel arrays 126, the seventh pixel array 127 and the eighth pixel arrays 128 are all pixel arrays of even-numbered rows in the original print data, and are formed between each of the first pixel arrays 121, the second pixel arrays 122, the third pixel arrays 123 and the fourth pixel arrays 124.

In this manner, in accordance with the first divided print data, the print device 30 forms the first pixel arrays 121, the second pixel arrays 122, the third pixel arrays 123 and the fourth pixel arrays 124 that correspond to pixel arrays of odd-numbered rows in the original print data, at a resolution that is half the resolution of the original print data with respect to the sub-scanning direction. The print device 30 returns the platen 39 to a position before the printing. Then, in accordance with the second divided print data, the print device 30 forms the fifth pixel arrays 125, the sixth pixel arrays 126, the seventh pixel arrays 127 and the eighth pixel arrays 128 that correspond to pixel arrays of even-numbered rows in the original print data, at a resolution that is half the resolution of the original print data with respect to the sub-scanning direction. Gaps between the first pixel arrays 121, the second pixel arrays 122, the third pixel arrays 123 and the fourth pixel arrays 124 are filled by the fifth pixel arrays 125, the sixth pixel arrays 126, the seventh pixel arrays 127 and the eighth pixel arrays 128. In this manner, an image formed by the plurality of pixel arrays is printed on the fabric.

The state of the ink ejected onto the fabric will be described taking solid printing as an example. An ink 131 ejected at the beginning of the formation of the first pixel arrays 121 in accordance with the first divided print data permeates into the fabric, and gradually dries out while spreading in the thickness direction and the plane direction of the fabric. In the same manner, an ink 132 ejected just before the end of the formation of the first pixel arrays 121 gradually dries out while permeating into the fabric and spreading. When the formation of the second pixel arrays 122 is started, an ink 133 at the beginning of the formation of the second pixel arrays 122 is ejected onto a position that has moved by two pixels in the sub-scanning direction from the ink 132 ejected just before the end of the formation of the first pixel arrays 121. An ink 134 just before the end of the formation of the second pixel arrays 122 is ejected onto a position that has moved by two pixels in the sub-scanning direction from the ink 131 ejected at the beginning of the formation of the first pixel arrays 121. Both of the inks 133 and 134 of the second pixel arrays 122 are positioned with one row between them by moving in the sub-scanning direction by two pixels from the inks 132 and 131 of the first pixel arrays 121. Therefore, the inks 132 and 131 of the first pixel arrays 121 and the inks 133 and 134 of the second pixel arrays 122 respectively dry out while independently permeating into the fabric and spreading.

When each of the fifth pixel arrays 125 is formed between the first pixel array 121 and the second pixel array 122 in accordance with the second divided print data, the inks 131 to 134 are in a state in which they have widely spread in the plane direction and drying out of the inks 131 to 134 has progressed. An ink 135 ejected at the beginning of the formation of the fifth pixel arrays 125 is disposed on the fabric in such a manner that a part of the ink 135 is placed on films respectively formed by the drying out of the ink 131 ejected at the beginning of the formation of the first pixel arrays 121 and the ink 134 ejected just before the end of the formation of the second pixel arrays 122. The part of the ink 135 that is placed on the films of the inks 131 and 134 is unlikely to permeate into the fabric in the thickness direction, and dries out on the films of the inks 131 and 134. In the same manner, an ink 136 ejected just before the end of the formation of the fifth pixel arrays 125 is disposed on the fabric in such a manner that a part of the ink 136 is placed on films respectively formed by the drying out of the ink 132 ejected just before the end of the formation of the first pixel arrays 121 and the ink 133 ejected at the beginning of the formation of the second pixel arrays 122. The part of the ink 136 that is placed on the films of the inks 132 and 133 is unlikely to permeate into the fabric in the thickness direction, and dries out on the films of the inks 132 and 133. This also applies to other inks in the formation process of the fifth pixel arrays 125. Therefore, the density difference between the pixels formed by the inks 131 to 136 decreases. Thus, in an image printed by the divided print processing, the banding is unlikely to occur and it is possible to improve the print quality. A part of the ink ejected based on the second divided print data is placed on the films generated by the drying out of the inks ejected based on the first divided print data. It is therefore possible to form a section where the inks overlap with each other, and the density of the pixels formed by the inks can be increased over the whole image.

In this manner, the divided print data is generated such that the ejection information indicated by the original print data is divided into m sets based on the above-described Expression (1). Thus, the print device 30 can form the pixel arrays at an interval corresponding to (m−1) pixels in the sub-scanning direction, for each of the divided print data. In other words, in the print processing based on one of the divided print data, the print device 30 does not form a pixel array continuously with a pixel array that is adjacent in the sub-scanning direction. Thus, the print device 30 is unlikely to generate a color density difference caused by ink ejection positions, and can suppress the occurrence of banding.

The divided print data for the print device 30 to dividedly perform the print processing is generated by the CPU 40 of the print device 30 such that the CPU 40 processes the original print data received from the PC 1 in accordance with the main program. The CPU 40 performs the print processing in accordance with the divided print data, and thus performs the printing of an image etc. on the fabric in a divided manner for each of the divided print data.

Main processing performed by the CPU 40 will be described with reference to FIG. 6. When a power supply switch (not shown in the drawings) of the print device 30 is turned on, the CPU 40 reads out the main program from the ROM 41 and performs the main processing.

In the PC 1, based on an operation by the user, an application to edit an image to be printed on the fabric is executed. When a print command for the image is output from the application, the CPU 10 of the PC 1 activates the printer driver and generates the original print data from the data of the image generated by the application. The CPU 10 transmits the original print data to the print device 30.

The CPU 40 determines whether or not the original print data transmitted from the PC 1 has been acquired (step S11). When the original print data has not been acquired (no at step S11), the CPU 40 determines whether or not a command for various setting has been input by the user operating the operation panel 51 (refer to FIG. 3) (step S12). For example, at step S12, a command to execute one of first generation processing and second generation processing, which will be described later, can be received. At step S12, a command can be received as to whether or not to set a standby time period, which will be described later. At step S12, a command to generate the divided print data based on a print area can be received. When the command for various setting has not been input (no at step S12), the CPU 40 returns the processing to step S11. When the command for various setting has been input (yes at step S12), the CPU 40 stores the command input at step S12 in the RAM 42 (step S13). The CPU 40 returns the processing to step S11.

When the original print data has been acquired (yes at step S11), the CPU 40 determines whether or not a divided print flag included in the original print data acquired at step S11 is ON (step S14). The divided print flag is a flag indicating a command as to whether or not to perform the print processing by generating the divided print data. When the original print data is generated by executing the printer driver, the CPU 10 of the PC 1 sets ON/OFF of the divided print flag based on an operation by the user, and includes the divided print flag in the original print data. When the divided print flag is OFF (no at step S14), the CPU 40 does not generate the divided print data and performs printing based on the original print data (step S15). At step S15, similarly to the print processing described using FIG. 4, an image is printed on the fabric placed on the platen 39 by performing the known print processing. More specifically, in accordance with the ejection information included in the original print data, the CPU 40 causes the ink to be ejected from each of the ejection openings 36 while relatively moving the ejection heads 35 and the platen 39 in the main scanning direction and the sub-scanning direction. After the printing based on the original print data is complete, the CPU 40 returns the processing to step S11. When the divided print flag included in the original print data is ON (yes at step S14), the CPU 40 performs divided print data generation processing (step S16).

The divided print data generation processing will be described with reference to FIG. 7. The CPU 40 determines whether or not to generate the divided print data based on the print area (step S31). When the setting to generate the divided print data based on the print area is stored in the RAM 42 at step S13 (refer to FIG. 6), the CPU 40 determines that the divided print data is to be generated based on the print area (yes at step S31). When a flag indicating the command to generate the divided print data based on the print area is included in the original print data, the CPU 40 determines that the divided print data is to be generated based on the print area (yes at step S31). When the CPU 10 of the PC 1 executes the printer driver and generates the original print data, based on an operation by the user, the CPU 10 sets ON/OFF of the flag indicating the command to generate the divided print data based on the print area, and includes the flag in the original print data.

When the divided print data is not generated based on the print area (no at step S31), the CPU 40 determines whether or not to generate the divided print data by the first generation processing (step S32). Hereinafter, a percentage of the number of pixel arrays in a divided region, which is a formation region of the pixel arrays formed based on the divided print data, with respect to the number of pixel arrays in the original region 80 is referred to as an occupancy rate. The first generation processing is processing to generate a plurality of the divided print data such that the occupancy rate for each of the divided print data is less than 100 percent and a total value of the occupancy rates for all the divided print data is 100 percent. The total value of the occupancy rates for all the divided print data is 100 percent. Therefore, in the divided regions based on each of the divided print data, the pixel arrays to be formed do not overlap with each other. Thus, the ink ejection positions based on each of the divided print data do not overlap with each other.

When the setting to generate the divided print data by the first generation processing is stored in the RAM 42 at step S13 (refer to FIG. 6), the CPU 40 determines that the divided print data is to be generated by the first generation processing (yes at step S32). When a flag indicating the command to generate the divided print data by the first generation processing is included in the original print data, the CPU 40 determines that the divided print data is to be generated by the first generation processing (yes at step S32). When the CPU 10 of the PC 1 executes the printer driver and generates the original print data, based on an operation by the user, the CPU 10 sets ON/OFF of the flag indicating the command to generate the divided print data by the first generation processing, and includes the flag in the original print data.

When it is determined that the divided print data is to be generated by the first generation processing (yes at step S32), the CPU 40 generates the divided print data by the first generation processing (step S33). In the description below, as a first specific example, a case will be described in which first divided print data and second divided print data are generated. The first divided print data is configured by the ejection information to form pixel arrays of odd-numbered rows in the original region 80. The second divided print data is configured by the ejection information to form pixel arrays of even-numbered rows in the original region 80. In this case, the occupancy rates of the first divided print data and the second divided print data are each 50 percent, and the total value thereof is 100 percent.

When the first divided print data and the second divided print data in the first specific example are generated, the processing at step S33 is performed in the following manner. Based on the above-described Expression (1), the CPU 40 divides the ejection information included in the original print data into a set of the ejection information to form the pixel arrays of the odd-numbered rows and a set of the ejection information to form the pixel arrays of the even-numbered rows. The CPU 40 generates the first divided print data configured by the set of the ejection information to form the pixel arrays of the odd-numbered rows, and generates the second divided print data configured by the set of the ejection information to form the pixel arrays of the even-numbered rows. More specifically, the CPU 40 divides the ejection information indicated by the original print data into a plurality (two in the first specific example) for each of the pixel array groups aligned in the sub-scanning direction. The CPU 40 generates a plurality of the divided print data (the first divided print data and the second divided print data in the first specific example) corresponding to each of the divided sets. The CPU 40 stores the generated first divided print data and the generated second divided print data in the RAM 42.

The CPU 40 determines whether or not to set the standby time period (step S35). In a case in which, after the print device 30 has performed the print processing based on one of the plurality of divided print data (hereinafter referred to as first print processing), the print device 30 then performs the print processing based on other divided print data (hereinafter referred to as second print processing) of the plurality of divided print data, the standby time period is a time period to stand by from completion of the first print processing to start of the second print processing. In the case of the first specific example, after the first print processing has been performed based on the first divided print data, the second print processing is performed based on the second divided print data.

For example, when the setting based on a command to set the standby time period is stored in the RAM 42 at step S13 (refer to FIG. 6), the CPU 40 determines that the standby time period is to be set (yes at step S35). When a flag indicating the command to set the standby time period is included in the original print data, the CPU 40 determines that the standby time period is to be set (yes at step S35). When the CPU 10 of the PC 1 executes the printer driver and generates the original print data, based on an operation by the user, the CPU 10 sets ON/OFF of the flag indicating the command to set the standby time period, and includes the flag in the original print data. The CPU 40 may simulate the print processing that is performed using the plurality of divided print data generated at step S33 or step S34, and may determine whether or not to set the standby time period based on an estimated printing time or the like.

In the case of the first specific example, the standby time period is not set (no at step S35). Therefore, the CPU 40 returns the processing to the main processing. As shown in FIG. 6, the CPU 40 sets a variable P to 1 and stores the set variable P in the RAM 42 (step S17). The CPU 40 disposes the platen 39 at the print start position (step S18).

The CPU 40 performs the print processing based on P-th divided print data indicated by the variable P (step S19). When the variable P is equal to 1, the print processing is performed based on the first divided print data, which is the divided print data scheduled first in the order of processing. In the first specific example, in the same manner as the case described using FIG. 5, the pixel arrays of the odd-numbered rows only are formed on the fabric based on the first divided print data. As a result, an image is formed in which the resolution in the sub-scanning direction is half the resolution in the sub-scanning direction of a printed image based on the original print data. Since the pixel arrays of the odd-numbered rows only are formed, the CPU 40 completes the print processing based on the first divided print data, in approximately half the time required to form all the pixel arrays by the print processing based on the original print data.

The CPU 40 determines whether or not the print processing based on all the divided print data has been performed (step S20). In the first specific example, it is determined that the print processing based on the second divided print data has not been performed (no at step S20), and the CPU 40 increments the variable P and stores the incremented variable P in the RAM 42 (step S21). The CPU 40 returns the platen 39, which has moved in the conveyance direction as a result of the processing at step S19, to the print start position (step S22). The CPU 40 determines whether or not the standby time period has been set (step S23). More specifically, when the setting based on the command to set the standby time period is not stored in the RAM 42 or when the flag indicating the command to set the standby time period is not included in the original print data, it is determined that the standby time period has not been set (no at step S23), and the CPU 40 returns the processing to step S19. For example, in the case of the first specific example, the standby time period has not been set.

Since the variable P is set to 2 at step S21, the CPU 40 performs the print processing based on the second divided print data, which is the divided print data scheduled second in the order of processing (step S19). In the first specific example, in the same manner as the case described using FIG. 5, the pixel arrays of the even-numbered rows only are formed on the fabric based on the second divided print data. As a result, an image is further formed in which the resolution in the sub-scanning direction is half the resolution in the sub-scanning direction of the printed image based on the original print data. Since the pixel arrays of the even-numbered rows only are formed, the CPU 40 completes the print processing based on the second divided print data, in approximately half the time required to form all the pixel arrays by the print processing based on the original print data.

The pixel arrays of the even-numbered rows are formed between the pixel arrays of the odd-numbered rows that have already been formed. Therefore, all the pixel arrays are formed on the fabric, and an image similar to the image based on the original print data is formed. The formation of the pixel arrays of the even-numbered rows based on the second divided print data is performed after the completion of the formation of all the pixel arrays of the odd-numbered rows based on the first divided print data. As described above, a part of the ink forming the pixel arrays of the even-numbered rows is placed on the films formed by the drying out of the ink used to form the pixels that form the pixel arrays of the odd-numbered rows. Therefore, formed on the fabric is an image in which the density of the pixels formed by the ink is increased over the whole of the pixels.

In the case of the first specific example, after the printing is performed using the second divided print data, the CPU 40 determines that the print processing has been performed based on all the divided print data (yes at step S20), and returns the processing to step S11.

In this manner, based on the generated first divided print data, the print device 30 causes the ejection heads 35 to perform overall scanning with respect to the fabric, and forms the pixel arrays of the odd-numbered rows on the fabric. Based on the second divided print data, the print device 30 causes the ejection heads 35 to scan the fabric once again, and forms on the fabric the pixel arrays of the even-numbered rows that are adjacent to the pixel arrays of the odd-numbered rows in the sub-scanning direction. From the formation of the pixel arrays of the odd-numbered rows to the ejection of the ink to form the pixel arrays of the even-numbered rows, a time lag is generated due to the overall scanning of the ejection heads 35 with respect to the fabric. Therefore, a drying time period can be secured for the ink of the pixel arrays of the odd-numbered rows. The ink necessary to form the pixel arrays of the even-numbered rows is ejected onto the films formed by the ink of the pixel arrays of the odd-numbered rows that has dried out to some extent. Thus, the permeation of the ink into the fabric is suppressed and it is possible to suppress a decrease in color density. In this manner, the print device 30 generates a plurality of the divided print data, and thus can enhance the color density of a printed image in comparison to the related art. Thus, the print device 30 can improve the print quality.

Over the whole image, regardless of the ejection positions, the ink of the pixel array of an even-numbered row is ejected next to the pixel array of an odd-numbered row in a state in which the ink of the pixel array of the odd-numbered row has dried out to some extent. In other words, a relationship between the state of the ink of one of the pixels included in the pixel array of the odd-numbered row and the state of the ink of the pixels included in the pixel array of the even-numbered row formed adjacent to the pixel array of the odd-numbered row is substantially the same relationship over the whole image, regardless of being on one end side or the other end side of the pixel arrays. Thus, by generating the plurality of divided print data, the print device 30 makes it difficult for the color density difference to occur due to the ink ejection positions, and it is possible to suppress the occurrence of banding. Thus, the print device 30 can improve the print quality.

The pixel arrays forming the image based on the divided print data are formed by thinning out some of the pixel arrays forming the image based on the original print data. Therefore, the resolution of the image based on the divided print data is lower than the resolution of the image based on the original print data. Thus, the number of times that the ejection heads 35 scan the fabric in the print processing based on the divided print data is smaller than the number of times that scanning is performed in the print processing based on the original print data. In other words, the time required to perform the print processing based on one of the divided print data is shorter than the printing time based on the original print data, by a difference in the number of times of scanning. A sum of the number of times that the ejection heads 35 perform the scanning based on all the divided print data is substantially the same as the number of times that the ejection heads 35 perform the scanning based on the original print data. Therefore, the printing time based on all the divided print data is longer than the printing time based on the original print data. Note, however, that the difference between them corresponds to the time required for the platen 39 to return to the print start position after the print processing based on one of the divided print data. Therefore, even when the print device 30 divides the print processing based on the divided print data, the printing time is not significantly increased in comparison to the printing time based on the original print data. Thus, the print device 30 can improve the print quality of the printed image while suppressing an increase in the printing time. This also applies to the divided print data generated at step S39 (refer to FIG. 7) to be described later.

The CPU 40 performs the first generation processing that generates a plurality of the divided print data such that the occupancy rate for each of the divided print data is less than 100 percent and the total value of the occupancy rates for all the divided print data is 100 percent (step S33). The resolution of the image that is formed based on each of the divided print data is lower than the resolution of the image that is formed based on the original print data. However, the print processing based on all the divided print data is individually performed with respect to the divided regions for which the occupancy rate is less than 100 percent, without overlapping of the ink ejection positions. Thus, an image of the same resolution as the resolution of the image formed based on the original print data is formed in the original region 80 (refer to FIG. 5). In other words, the amount of ink used when dividing the print processing is the same as the amount of ink used when performing the print processing based on the original print data. Therefore, the print device 30 can enhance the print quality in comparison to the related art, without increasing the amount of ink used for the print processing. This also applies to the divided print data generated at step S39 (refer to FIG. 7) to be described later.

A second specific example, which is obtained by modifying the first specific example to an example in which the standby time period is set, will be described. In the case of the second specific example, similarly to the first specific example, the CPU 40 performs the processing at steps S11 to S14 and step S16 shown in FIG. 6 and the processing at steps S31, S32, S33 and S35 shown in FIG. 7. The CPU 40 determines that the standby time period is to be set (yes at step S35), sets the standby time period, and stores it in the RAM 42 (step S36).

In the present specific example, it is assumed that the standby time period is set to 15 seconds. The CPU 40 returns the processing to the main processing shown in FIG. 6, and performs the processing at step S17 to step S23. The CPU 40 determines that the standby time period has been set (yes at step S23), and determines whether or not the standby time period set at step S36 or step S42 (which will be described later) has elapsed (step S24). When the standby time period has not elapsed (no at step S24), the CPU 40 repeats the processing at step S24. That is, the CPU 40 stands by until the standby time period elapses. Although not shown in the drawings, when the standby time period is set at step S36 or step S42 (which will be described later), a software timer or the like is used to measure a time period from a time point at which the print processing at step S19 is complete. The CPU 40 stands by until the measured time period reaches 15 seconds, which is the standby time period. When the standby time period has elapsed (yes at step S24), the CPU 40 returns the processing to step S19 and performs the print processing based on the second divided print data.

Before starting the second print processing based on the second divided print data, the CPU 40 waits for the elapse of the standby time period. Thus, the CPU 40 can further secure the drying time period corresponding to at least the standby time period in order to allow the ink ejected by the print processing based on the first divided print data to dry out. For example, when the standby time period is not set, if the print area is relatively small, the time period for the print processing based on the first divided print data is short and there is a possibility that the print processing based on the second divided print data may be started before the ink dries out. However, in the present specific example, since the standby time period is set, the possibility of securing the drying time period for the ink is increased even when an image having a relatively small print area is printed. Thus, the print quality of the image having a relatively small print area is secured such that the density difference between the pixels is similar to that in the printing of an image having a relatively large print area.

A case will be described in which the divided print data is generated by the second generation processing. The second generation processing is processing that generates a plurality of the divided print data such that the occupancy rate for each of all the divided print data is equal to or less than 100 percent, the occupancy rate for at least one of the divided print data is less than 100 percent, and a total value of the occupancy rates for all the divided print data is more than 100 percent. The total value of the occupancy rates for all the divided print data is more than 100 percent. Therefore, in the divided regions based on each of the divided print data, the pixel arrays to be formed overlap with each other. Therefore, the ink ejection positions based on each of the divided print data partially overlap with each other. Hereinafter, in order to simplify the description, a state in which the pixel arrays formed in one divided region and the pixel arrays formed in another divided region overlap with each other is expressed as "overlapping of the divided regions."

The CPU 40 determines that the divided print data is not to be generated by the first generation processing (no at step S32), and generates the divided print data by the second generation processing (step S34). In the description below, a third specific example will be described in which the first divided print data and the second divided print data are generated. The first divided print data is configured by the ejection information to form pixel arrays of the rows whose sequence numbers in the original print data (hereinafter referred to as "row numbers in the original print data") are multiples of 4. The second divided print data is configured by all the ejection information in the original print data. In this case, the occupancy rate of the first divided print data is 25 percent, and the occupancy rate of the second divided print data is 100 percent, and the total value thereof is 125 percent.

When the first divided print data and the second divided print data in the third specific example are generated, the processing at step S34 is performed in the following manner. The CPU 40 generates the first divided print data configured by a set of the ejection information to form the pixel arrays of the rows for which the row numbers in the original print data are multiples of 4. The CPU 40 generates the second divided print data configured by a set of the ejection information to form all the pixel arrays. In other words, based on Expression (1), the CPU 40 divides the ejection information included in the original print data into the set of the ejection information to form the pixel arrays of the rows for which the row numbers in the original print data are multiples of 4, and the set of the ejection information to form all the pixel arrays. In this manner, the CPU 40 divides the ejection information indicated by the original print data into a plurality (two) for each of the pixel array groups aligned in the sub-scanning direction, and generates the first divided print data and the second divided print data corresponding to each of the divided sets. The CPU 40 stores the generated first divided print data and the generated second divided print data in the RAM 42.

The CPU 40 advances the processing to step S35. In the third specific example, the processing at step S36 may be performed and the standby time period may be set in the same manner as in the case of the second specific example.

Figure 6:
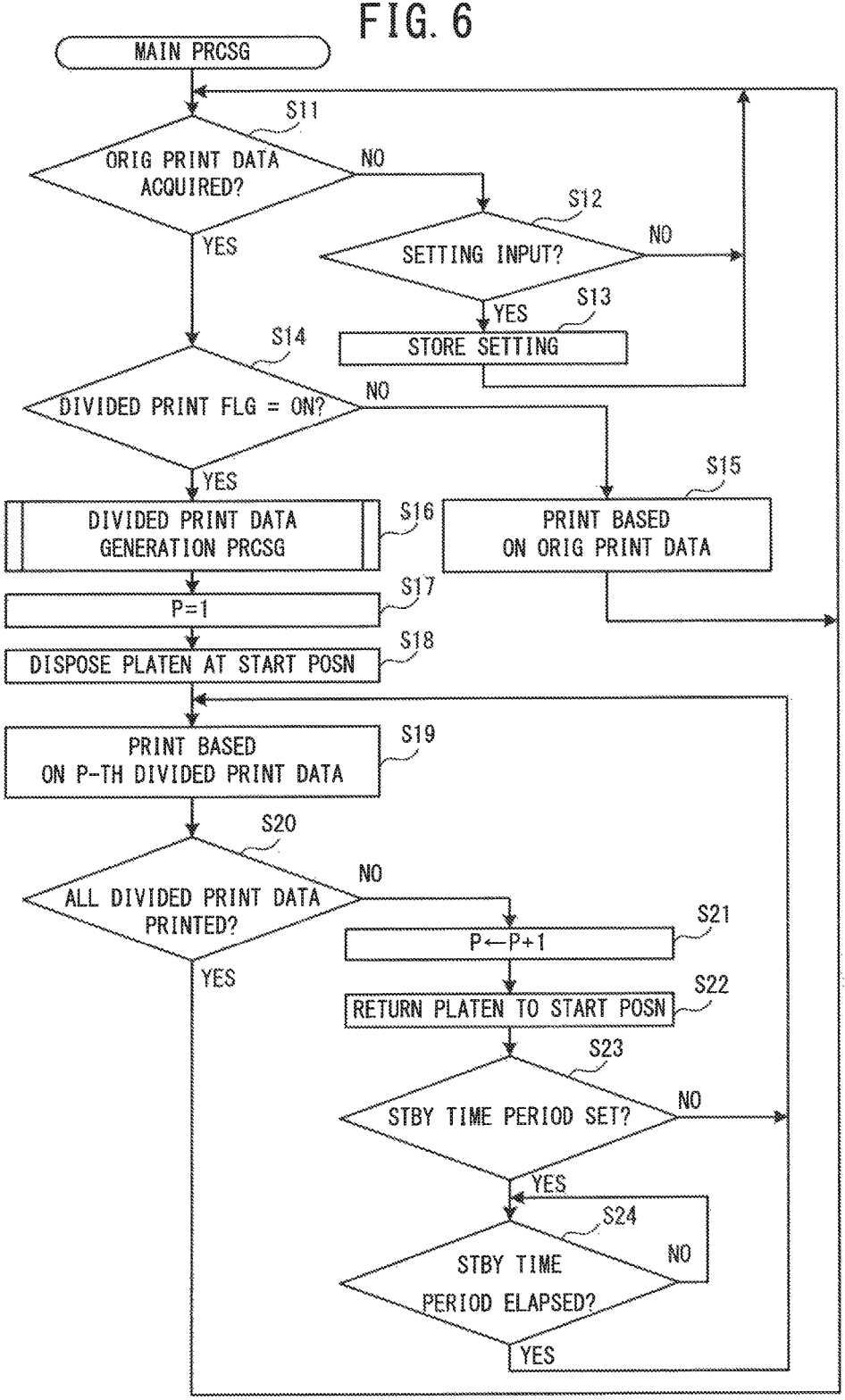
FIG. 6 is a flowchart of main processing.

As shown in FIG. 6, the CPU 40 performs the print processing (step S19). In the third specific example, when the variable P is equal to 1, the pixel arrays of the rows for which the row numbers in the original print data are multiples of 4 only are formed on the fabric based on the first divided print data. As a result of this, an image is formed in which the resolution in the sub-scanning direction is ¼ the resolution in the sub-scanning direction of the image formed by the printing based on the original print data. Since the pixel arrays of the rows for which the row numbers in the original print data are multiples of 4 only are formed, the CPU 40 completes the print processing based on the first divided print data, in approximately ¼ of the time required to form all the pixel arrays by the print processing based on the original print data.

After the CPU 40 returns the platen 39 to the print start position (step S22), the CPU 40 performs the processing at step S19. Since the variable P is set to 2 at step S21, the CPU 40 performs the print processing based on the second divided print data, which is the divided print data scheduled second in the order of processing (step S19). In the third specific example, all the pixel arrays are formed on the fabric based on the second divided print data. As a result, an image is further formed in which the resolution in the sub-scanning direction is the same as the resolution in the sub-scanning direction of the printed image based on the original print data. In this case, in the pixel arrays of the rows for which the row numbers in the original print data are multiples of 4, the divided region based on the first divided print data overlaps with the divided region based on the second divided print data.

In the second generation processing, a plurality of the divided print data are generated such that the occupancy rate for each of all the divided print data is equal to or less than 100 percent, the occupancy rate for at least one of the divided print data is less than 100 percent, and a total value of the occupancy rates for all the divided print data is more than 100 percent (step S34). Therefore, the divided regions, which are regions in which the print processing is performed on the fabric based on each of the divided print data, occupy the entire region inside the original region 80 in which the printing is performed based on the original print data, in a state in which the regions at least partially overlap with each other. In other words, an image of the same resolution as the resolution of the printed image based on the original print data is formed in the original region 80. Thus, the CPU 40 can divide and perform the print processing and can enhance the color density of the printed image in comparison to the related art. The CPU 40 can cause the ink to be ejected in an overlapping manner, and can further improve the color density. Thus, the print device 30 can improve the print quality. The first divided print data generated at step S34 may be configured only from the ejection information to form the pixel arrays of the odd-numbered rows, for example.

The pixel arrays forming the image based on the first divided print data are pixel arrays formed by thinning out some of the pixel arrays forming the image based on the original print data. Therefore, the resolution of the image based on the first divided print data is lower than the resolution of the image based on the original print data. Thus, the number of times that the ejection heads 35 scan the fabric in the print processing based on the first divided print data is smaller than the number of times that scanning is performed in the print processing based on the original print data. Therefore, the printing time based on all the divided print data is longer than the printing time based on the original print data. However, there is only a slight difference between them and the slight difference is a time period corresponding to the print processing based on the first divided print data and a time period required for the platen 39 to return to the print start position after the print processing based on the first divided print data. Therefore, even when the print device 30 divides the print processing based on the divided print data, the printing time is not significantly increased in comparison to the time required to perform the print processing based on the original print data. In comparison to a case in which the first divided print data and the second divided print data are both configured by all the ejection information in the original print data, it is possible to reduce the time required to perform the print processing. Thus, the print device 30 can improve the print quality of the printed image while suppressing an increase in the printing time. This also applies to the divided print data generated at step S40 (refer to FIG. 7) to be described later.

A case will be described in which the divided print data is generated based on the print area. The CPU 40 determines that the divided print data is to be generated based on the print area (yes at step S31), and performs print area calculation processing (step S37).

Figure 8:
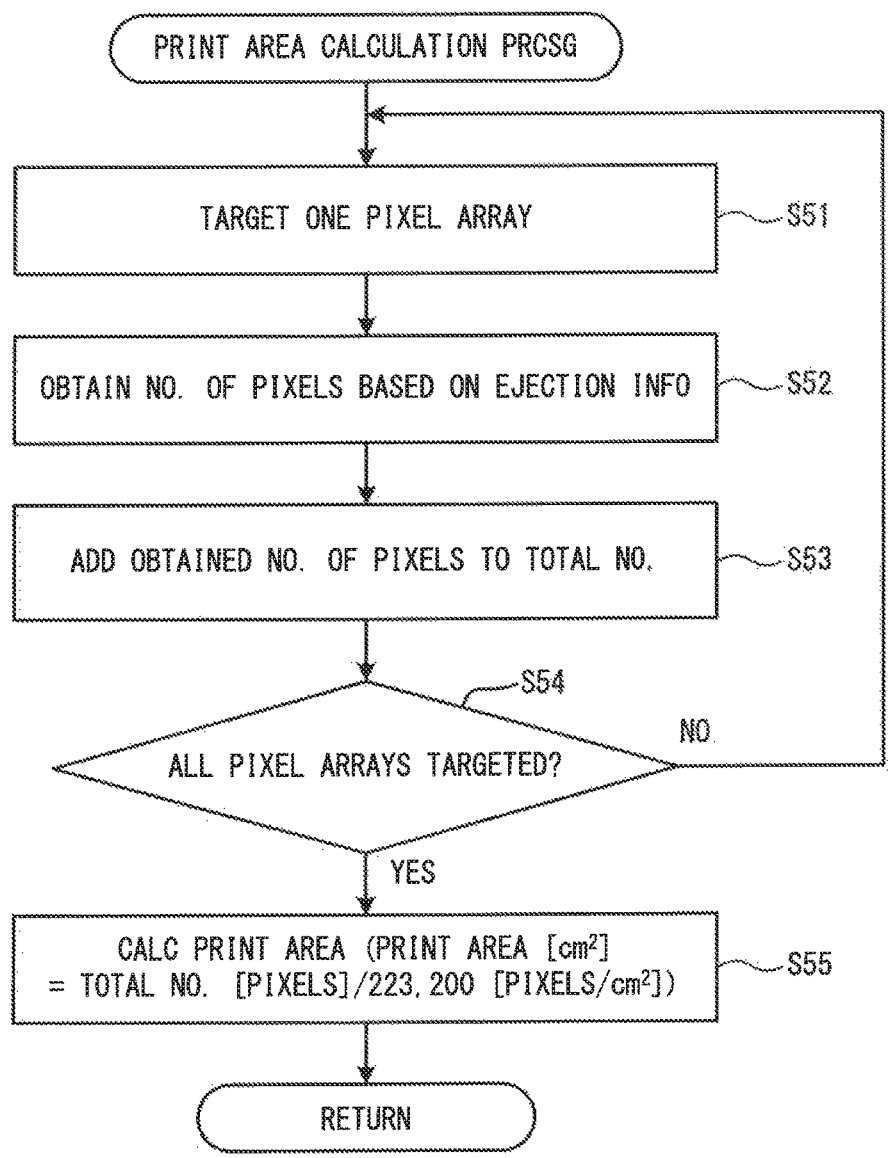
FIG. 8 is a flowchart of print area calculation processing.

The print area calculation processing will be described with reference to FIG. 8. In the print area calculation processing, the CPU 40 calculates the print area of an image to be printed on the fabric based on the ejection information indicated by the original print data. Hereinafter, an example of the calculation of the print area will be described.

The CPU 40 targets one (one row or one column) of the pixel arrays of the original print data, and sets it as a processing target (step S51). Based on the ejection information to form the targeted pixel array, the CPU 40 obtains the number of pixels to be formed by the targeted pixel array (step S52). The CPU 40 adds the obtained number of pixels to a total number, and stores it in the RAM 42 (step S53). The CPU 40 determines whether or not all the pixel arrays included in the original print data have been targeted at step S51 (step S54). When there is a pixel array that has not been targeted (no at step S54), the CPU 40 returns the processing to step S51 and targets a pixel array that has not been targeted. Then, in the same manner as that described above, the CPU 40 obtains the number of pixels and adds it to the total number. The CPU 40 adds the number of pixels of all the pixel arrays to the total number, and when there is no pixel array that has not been targeted (yes at step S54), the CPU 40 calculates the print area (step S55). For example, the print device 30 can perform printing at a resolution of 1,200×1,200 dpi, and the number of pixels per square centimeter is 223,200 pixels. Therefore, the CPU 40 calculates the print area [cm$^2$] by dividing the total number by 223,200. The CPU 40 stores the calculated print area in the RAM 42, and returns the processing to the divided print data generation processing (refer to FIG. 7).

Figure 7:
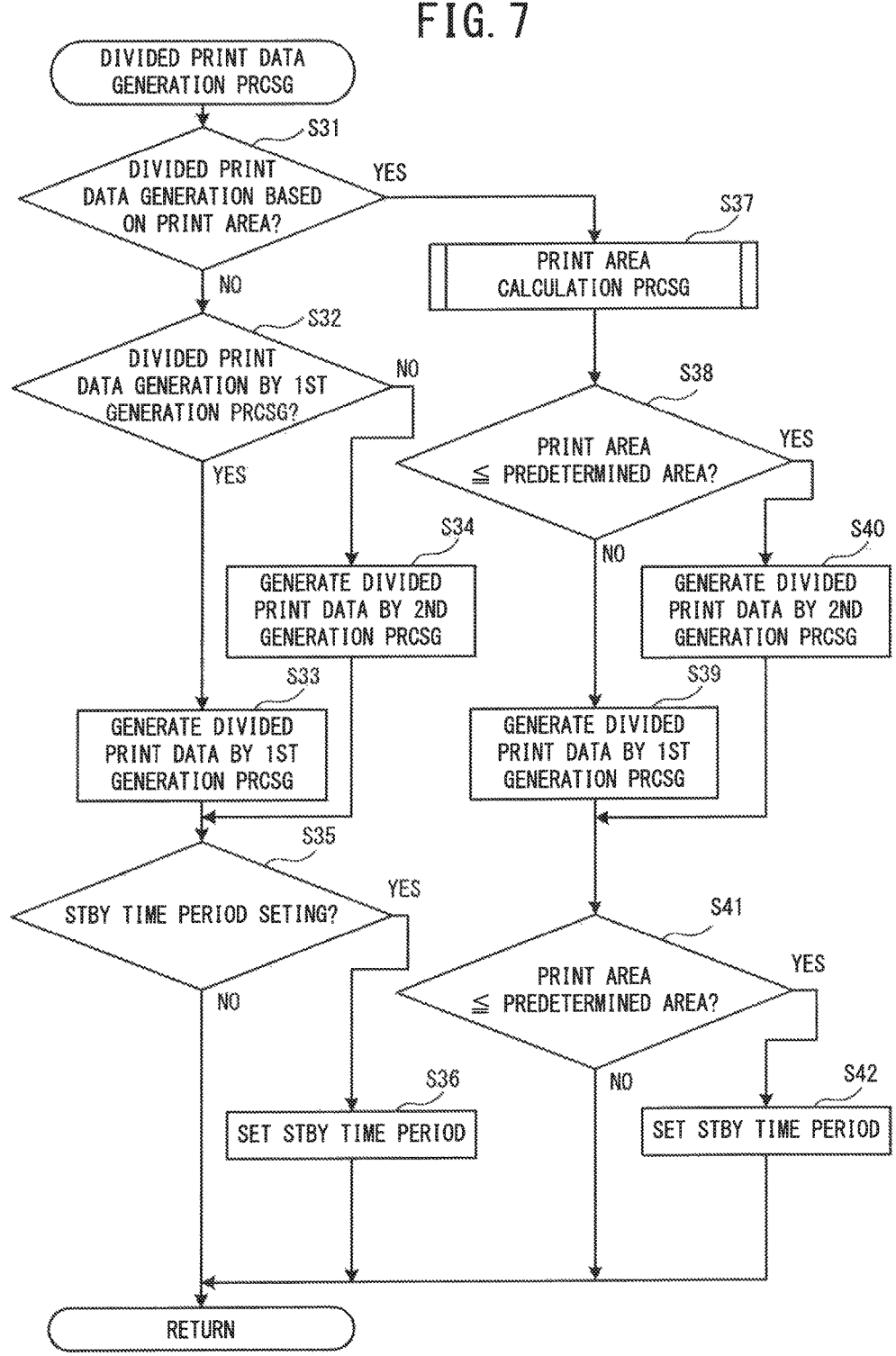
FIG. 7 is a flowchart of divided print data generation processing.

As shown in FIG. 7, the CPU 40 determines whether or not the print area calculated at step S37 is equal to or less than a predetermined area set in advance (step S38). The predetermined area is stored in the RAM 41 (refer to FIG. 3) in advance. When the print area is not equal to or less than the predetermined area (no at step S38), the CPU 40 generates the divided print data by the first generation processing in the same manner as at step S33 (step S39). When the print area is equal to or less than the predetermined area (yes at step S38), the CPU 40 generates the divided print data by the second generation processing in the same manner as at step S34 (step S40).

After performing the processing at step S39 or step S40, the CPU 40 determines whether or not the print area calculated at step S37 is equal to or less than a predetermined area set in advance (step S41). In the present embodiment, the predetermined area used for the determination at step S38 is the same as the predetermined area used in the determination at step S41.

When the print area is equal to or less than the predetermined area (yes at step S41), a standby time period is set in the same manner as at step S36 (step S42). When the print area is not equal to or less than the predetermined area (no at step S41), or after the processing at step S42 is performed, the CPU 40 returns the processing to the main processing (refer to FIG. 6) and performs the processing at step S17 to step S24.

It is assumed that, in the print device 30, a speed of the relative movement of the ejection heads 35 and the platen 39 when the print processing is performed is constant, regardless of printing conditions. Therefore, the time period for the print processing based on the first divided print data substantially corresponds to the print area. Thus, when the print area is larger than the predetermined area, even when the print processing based on the second divided print data is performed immediately after the print processing based on the first divided print data, it is possible to obtain a drying time period for the ink ejected by the print processing based on the first divided print data.

When the print area is equal to or less than the predetermined area (yes at step S41), the standby time period is set (step S42). On the other hand, when the print area is larger than the predetermined area (no at step S41), the standby time period is not set. More specifically, at step S41, the CPU 40 determines whether or not to set the standby time period in accordance with the print area calculated at step S37. When it is determined at step S41 that the standby time period is to be set (yes at step S41), the CPU 40 sets the standby time period (step S42). When the print area is equal to or less than the predetermined area, the CPU 40 sets the standby time period. After the standby time period has elapsed from the execution of the print processing based on the first divided print data for which the print area is equal to or less than the predetermined area, the CPU 40 starts the execution of the second print processing based on the second divided print data. Therefore, before the execution of the print processing based on the second divided print data, it is possible to secure the drying time period for the ink by the print processing based on the first divided print data. By setting whether or not there is the standby time period in accordance with the print area, the CPU 40 can secure the color density of the printed image and can enhance the print quality.

When the print area is equal to or less than the predetermined area, the CPU 40 generates a plurality of the divided print data for which the divided regions overlap with each other (step S40), and sets the standby time period (step S42). Since the print device 30 performs the print processing based on the second divided print data after waiting for the elapse of the standby time period, it is possible to enhance the color density in a printing result and to ensure the print quality.

Step S38 is the processing that causes the processing at step S39 or step S40 to be performed in accordance with the print area calculated at step S37. Whether or not there is overlapping of the divided regions, and the occupancy rate differ between the plurality of divided print data generated by the first generation processing (step S39) and the plurality of divided print data generated by the second generation processing (step S40). More specifically, at step S38, the CPU 40 selects one of the execution of the processing at step S39 and the execution of the processing at step S40 in accordance with the print area calculated at step S37, and thus sets whether or not there is overlapping of the divided regions and sets the occupancy rate. Thus, in comparison to a case in which whether or not there is overlapping of the divided regions and the occupancy rate are not set in accordance with the print area, it is possible to secure the color density of the printed image and to enhance the print quality.

For example, the smaller the area of the image printed on the fabric, the greater the possibility that the ink based on the second divided print data may be ejected in a state in which the ink ejected based on the first divided print data has not dried out sufficiently. In a case that the ink ejected based on the first divided print data and the ink ejected adjacent to that based on the second divided print data both dry out while permeating into the record medium and spreading, the color density tends to decrease. In the present embodiment, even when the print area is equal to or less than the predetermined area, if the standby time period has been set, it is possible to obtain a sufficient drying time period for the ink ejected based on the first divided print data. Therefore, the CPU 40 generates a plurality of the divided print data for which the divided regions overlap (yes at step S38, and step S40), and performs printing by overlapping the divided regions, thus enhancing the color density of the printed image. When the print area is larger than the predetermined area, as described above, a part of the ink ejected based on the second divided print data is placed on the films generated as a result of sufficient drying out of the ink ejected based on the first divided print data, and thus overlapping sections of the inks are generated. Therefore, when the print area is larger than the predetermined area, even when the printing is performed without overlapping the divided regions, it is possible to enhance the color density of the printed image. For that reason, the CPU 40 generates a plurality of the divided print data for which the divided regions do not overlap (no at step S38, and step S39). The CPU 40 sets whether or not there is overlapping of the divided regions in accordance with the area of the image, and can thus secure the color density of the printed image and enhance the print quality.

As described above, in the present embodiment, the CPU 40 receives the command to perform one of the first generation processing and the second generation processing (yes at step S12), and stores the command in the RAM 42 (step S13). Of the first generation processing and the second generation processing, the CPU 40 performs the processing indicated by the command received at step S12 (step S32, step S33 and step S34). More specifically, when the received command is the command to perform the first generation processing that generates a plurality of the divided print data for which the divided regions do not overlap, the plurality of divided print data are generated by the first generation processing. As a result, it is possible to enhance the print quality in comparison to the related art, without increasing the amount of ink used for the print processing. When the received command is the command to perform the second generation processing that generates a plurality of the divided print data for which the divided regions overlap, the plurality of divided print data are generated by the second generation processing. As a result, in addition to effects obtained by the divided printing, it is possible to achieve a further improvement in the color density due to the ejection of the ink in the overlapping manner. It is possible to select one of the first generation processing and the second generation processing by operating the operation panel 51 (refer to FIG. 3), and thus user convenience is improved.

The CPU 40 receives a command as to whether or not to set the standby time period (yes at step S12), and stores the command in the RAM 42 (step S13). When the command indicating that the standby time period is to be set is received by the processing at step S12 (yes at step S35), the CPU 40 sets the standby time period (step S36). More specifically, when the standby time period is not set, the CPU 40 starts the second print processing immediately after performing the first print processing (no at step S23). It is thus possible to reduce the printing time. When the standby time period is set, the CPU 40 waits to start the second print processing until the standby time period elapses after performing the first print processing (step S24). It is thus possible to reliably secure the drying time period for the ink ejected in the first print processing. Thus, the print device 30 can enhance the print quality more reliably than in the related art. Since it is possible to set whether or not there is the standby time period by operating the operation panel 51 (refer to FIG. 3), the user convenience is improved.

The present disclosure is not limited to the above-described embodiment, and various modifications are possible. For example, the processing at step S12 and step S13 need not necessarily be performed and the command for various setting need not necessarily be received. The predetermined area used for the determination at step S38 may be different from the predetermined area used for the determination at step S41.

The CPU 40 generates two of the divided print data by the first generation processing (step S33 and step S39). However, it is sufficient if the divided print data is generated such that the occupancy rate for each of the divided print data is less than 100 percent and the total value of the occupancy rates for all the divided print data is 100 percent. Three or more of the divided print data may be generated by the first generation processing. As an example, the CPU 40 may generate the first divided print data, the second divided print data and third divided print data, by dividing the original print data such that each of the resolutions in the sub-scanning direction is one-third of the resolution of the original print data. In this case, for example, the first divided print data, the second divided print data and the third divided print data may be respectively configured, based on the above-described Expression (1), from the ejection information to form the pixel arrays of the rows for which the row numbers in the original print data are numbers obtained by subtracting 2 from multiples of 3, the pixel arrays of the rows for which the row numbers in the original print data are numbers obtained by subtracting 1 from multiples of 3, and the pixel arrays of the rows for which the row numbers in the original print data are multiples of 3. The CPU 40 may equally divide the original print data into four, or may equally divide the original print data into five.

The original print data need not necessarily be divided equally. For example, the CPU 40 may divide the original print data and generate the first divided print data, the second divided print data and the third divided print data such that their resolutions in the sub-scanning direction are ½, ¼ and ¼ of the resolution in the sub-scanning direction of the original print data. In this case, the first divided print data may be configured only from the ejection information to form the pixel arrays of the odd-numbered rows, for example. The second divided print data may be configured only from the ejection information to form the pixel arrays of the rows for which the row numbers in the original print data are multiples of 4. The third divided print data may be configured only from the ejection information to form the remaining pixel arrays.

In the second generation processing, the CPU 40 generates two of the divided print data, i.e., the first divided print data and the second divided print data (step S34 and step S40). However, the CPU 40 may generate three or more of the divided print data in the second generation processing, as long as the CPU 40 generates a plurality of the divided print data such that the occupancy rate for each of all the divided print data is equal to or less than 100 percent, the occupancy rate for at least one of the divided print data is less than 100 percent, and the total value of the occupancy rates for all the divided print data is more than 100 percent. As an example, the CPU 40 may divide the original print data and generate the first divided print data, the second divided print data and the third divided print data such that their resolutions in the sub-scanning direction are respectively ½, ½ and ½ of the resolution in the sub-scanning direction of the original print data. When the resolution of the whole image based on the original print data is 1,200 dpi, the resolutions of the images based on the first to third divided print data are respectively 600 dpi (the occupancy rate is 50 percent). In this case, the first divided print data and the third divided print data may be configured only from the ejection information to form the pixel arrays of the odd-numbered rows, for example. The second divided print data may be configured only from the ejection information to form the pixel arrays of the even-numbered rows, for example.

As an example, the CPU 40 may divide the original print data and generate the first divided print data, the second divided print data, the third divided print data and fourth divided print data such that their resolutions in the sub-scanning direction are respectively ¼, ½, ½ and ¼ of the resolution in the sub-scanning direction of the original print data. When the resolution of the whole image based on the original print data is 1,200 dpi, the resolutions of images based on the first and fourth divided print data are respectively 300 dpi (the occupancy rate is 25 percent), and the resolutions of images based on the second and third divided print data are respectively 600 dpi (the occupancy rate is 50 percent). In this case, the first divided print data may be configured only from the ejection information to form the pixel arrays of the rows for which the row numbers in the original print data are numbers obtained by subtracting 2 from multiples of 4, for example. The second divided print data may be configured only from the ejection information to form the pixel arrays of the odd-numbered rows, for example. The third divided print data may be configured only from the ejection information to form the pixel arrays of the even-numbered rows, for example. The fourth divided print data may be configured only from the ejection information to form the pixel arrays of the rows for which the row numbers in the original print data are multiples of 4, for example.

The method for setting the standby time period that is set at step S36 and step S42 is not limited. The standby time period may be set such that an interval from when the print device 30 starts the first print processing to when the print device 30 starts the second print processing is a predetermined time period. The predetermined time period is stored in the ROM 41 in advance. For example, the predetermined time period is set to a time period required for sufficient drying out of the ink of the first pixel array formed after the start of the first print processing. The predetermined time period is 30 seconds, for example. In this case, instead of the standby time period itself, the predetermined time period of 30 seconds is set and stored in the RAM 42 (step S36 and step S42). Although not shown in the drawings, a software timer or the like is used to measure a time period from a time point at which the print processing at step S19 is started. The first print processing is performed (step S19), the platen 39 is returned to the print start position (step S22), and the CPU 40 stands by until the predetermined time period elapses (no at step S24). When the predetermined time period has elapsed (yes at step S24), the second print processing is started (step S19). It is assumed that the time period to perform the first print processing is 20 seconds. In this case, the standby time period, which is a time period from the completion of the first print processing to the start of the second print processing, is 10 seconds. That is, at step S36, the standby time period of 10 seconds is set by the setting of the predetermined time period of 30 seconds.

In the above-described example, the standby time period is set by setting the predetermined time period from when the print device 30 starts the first print processing to when the print device 30 starts the second print processing. However, the present disclosure is not limited to this example. For example, the CPU 40 may set the standby time period itself such that an interval from when the print device 30 starts the first print processing to when the print device 30 starts the second print processing is the predetermined time period (step S36 and step S42). In this case, the CPU 40 calculates an estimated time period required for the first print processing based on the divided print data. The CPU 40 sets, as the standby time period, a value obtained by subtracting the estimated time period required for the first print processing from the predetermined time period stored in the ROM 41 (step S36 and step S42). The CPU 40 measures a time period from the time point at which the print processing by step S19 is complete, and stands by until the measured time period reaches the standby time period (step S24).

In this manner, when the standby time period is set such that the interval from when the print device 30 starts the first print processing to when the print device 30 starts the second print processing is the predetermined time period, it is possible to more reliably secure the drying time period for the ink in comparison to a case in which the interval from the start of the first print processing to the start of the second print processing is not taken into consideration. Thus, even in a case of the printing of an image whose print area is relatively small, the CPU 40 can more reliably secure the print quality at the same level as the quality of the printing of an image whose print area is relatively large.

When the predetermined time period is shorter than the time period for the first print processing, it is immediately determined at step S24 that the standby time period has elapsed (yes at step S24). Alternatively, the standby time period is set to 0 at step S36 and step S42. The processing at step S35, step S36, step S41 and step S42 need not necessarily be performed and the standby time period need not necessarily be set.

At step S24, the main processing is not advanced until the standby time period elapses. The time period obtained by adding the time period of the print processing based on the first divided print data and the standby time period is referred to as a total standby time period. In this case, the present disclosure is not limited to the mode in which the CPU 40 stands by until the standby time period elapses at step S24. In the print processing based on the first divided print data, the CPU 40 may adjust a relative movement speed of the ejection heads 35 and the platen 39 in the main scanning direction and the sub-scanning direction so that the total standby time period elapses when the print processing based on the first divided print data is complete or when the platen 39 is thereafter returned to the print start position. That is, the standby time period of the embodiment is not limited to a time period during which the print device 30 is not performing the print processing, and includes a concept of a time period to delay the completion of the print processing by adjusting the relative movement speed of the ejection heads 35 and the platen 39 in the main scanning direction and the sub-scanning direction.

In the embodiment, when a plurality of the divided print data are generated, the CPU 40 divides the ejection information indicated by the original print data for pixel array groups, each group includes a plurality of pixel arrays, and each pixel array includes pixels aligned in the main scanning direction. However, the present disclosure is not limited to this example. The CPU 40 may divide the ejection information indicated by the original print data for pixel array groups, each group includes a plurality of pixel arrays, and each pixel array includes pixels aligned in the sub-scanning direction, then generate a plurality of the divided print data. Even in this case, it is possible to obtain effects similar to those of the embodiment.

A plurality of the divided print data may be generated by a printer driver that is read out from the HDD 14 and activated by the CPU 10 of the PC 1. More specifically, based on a print command output from an application executed on the PC 1, the CPU 10 generates the original print data from image data generated by the application. The CPU 10 performs step S11 and step S16 in the main processing of the embodiment and each of the processing steps shown in FIG. 7 and FIG. 8, and generates a plurality of the divided print data from the original print data. The CPU 10 combines the plurality of divided print data into one piece of the print data, and transmits the combined print data to the print device 30. When the standby time period is set, information indicating the standby time period may be included in the print data. The CPU 40 of the print device 30 may receive the print data, and may perform the print processing based on the plurality of divided print data and the information indicating the standby time period included in the print data. The PC 1 generates the print data including the plurality of divided print data based on the original print data, and causes the print device 30 to perform the divided printing. It is thus possible to obtain effects similar to those of the embodiment.

In the embodiment, after all the divided print data are generated (step S33, step S34, step S39 and step S40), the printing is performed (step S19). However, the present disclosure is not limited to this example. For example, immediately after generating the first divided print data, the CPU 40 performs the printing based on the first divided print data, and returns the platen 39 to the print start position. Next, the CPU 40 generates the second divided print data, and performs the printing based on the second divided print data. That is, the CPU 40 may perform the printing while generating the divided print data. Further, the CPU 40 may further set a standby time period and cause the print device 30 to be in a standby state. Also in this case, it is possible to obtain effects similar to those of the embodiment.

At step S33, step S34, step S39 and step S40, the CPU 40 may generate a plurality of the divided print data such that the resolution of the image printed based on the original print data is an integer multiple of the resolution of the image printed based on each of the divided print data, and the resolution of the image printed based on each of the divided print data is an integer multiple of the resolution in an array of the ejection openings 36 of the ejection head 35. For example, when the resolution of the original print data is 1,200 dpi and the resolution in the array of the ejection openings 36 of the ejection head 35 is 150 dpi, the resolutions of the divided print data may be, for example, 150 dpi, 300 dpi and 600 dpi.

If the resolution of the image printed based on the divided print data is not an integer multiple of the resolution in the array of the ejection openings 36, the print device 30 causes some of the ejection openings 36 not to be used for the formation of the image based on the divided print data, and there is a possibility that the printing efficiency deteriorates and the printing speed becomes slower. This also applies to a case in which the resolution of the image printed based on the original print data is not an integer multiple of the resolution of the image printed based on the divided print data. In the present modified example, the resolution of the image printed based on each of the divided print data is an integer multiple of the resolution in the array of the ejection openings 36. Therefore, the print device 30 can efficiently use all the ejection openings 36 of the ejection head 35 so that they do not remain unused, and can form the image based on the divided print data. The resolution of the image printed based on the original print data is an integer multiple of the resolution of the image printed based on the divided print data. Thus, the print device 30 can efficiently use all the ejection openings 36 of the ejection head 35 so that they do not remain unused, and based on the print data, the print device 30 can form the same image as the image based on the original print data.

When a plurality of the divided print data are generated, they may be generated using conditions different from Expression (1). Although the first generation processing and the second generation processing are shown as an example of the processing to generate the divided print data, another method may be used to generate the divided print data. For example, a division condition table 110 shown in FIG. 9 may be used to generate the divided print data. In this case, in place of the divided print data generation processing shown in FIG. 7, divided print data generation processing according to a modified example shown in FIG. 10 may be performed (step S16 in FIG. 6). Hereinafter, this modified example will be described in detail. Similarly to the embodiment, it is assumed that the modified example below is an example in which the CPU 40 reads out a program from the ROM 41 and executes the program. Note, however, that the mode of processing of the modified example below is also not limited to this example. More specifically, the processing of the modified example below can be realized by the printer driver that is read out from the HDD 14 and activated by the CPU 10 of the PC 1.

Figure 10:
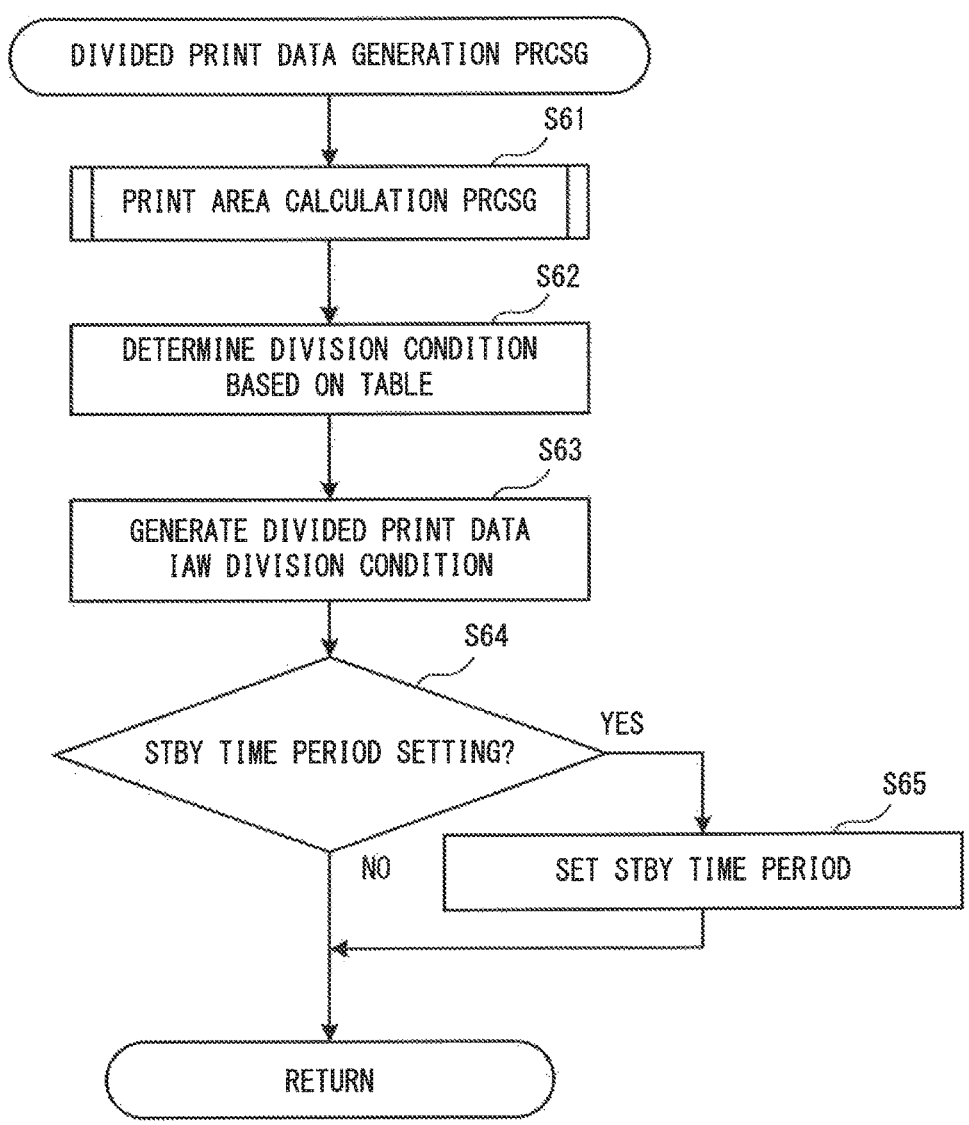
FIG. 10 is a flowchart of divided print data generation processing according to a modified example.

The division condition table 110 shown in FIG. 9 is generated as a table in which division condition, total divided values and existence/non-existence of the standby time period are set in advance in accordance with the print area, and is stored in the ROM 41. As shown in FIG. 10, the CPU 40 performs the print area calculation processing (step S61) in the same manner as at step S37 (refer to FIG. 7). Thus, the print area is calculated.

Based on the division condition table 110 shown in FIG. 9, the CPU 40 determines division condition in accordance with the print area (step S62). As an example, when the print area is less than 25 cm$^2$, the CPU 40 divides the original print data such that the resolutions in the sub-scanning direction of the first divided print data and the second divided print data are respectively ¼ and 1 of the resolution in the sub-scanning direction of the original print data, and determines that the standby time period is to be set. For example, when the resolution of the whole image based on the original print data is 1,200 dpi, the resolution of the image based on the first divided print data is 300 dpi (the occupancy rate is 25 percent), and the resolution of the image based on the second divided print data is 1,200 dpi (the occupancy rate is 100 percent). If the resolution of the image based on the divided print data is half the resolution of the original print data in the sub-scanning direction, it is 600 dpi (the occupancy rate is 50 percent).

When the print area is less than 25 cm$^2$, the division condition of the first divided print data is the condition in which the resolution is ¼ of the resolution of the original print data in the sub-scanning direction, and the division condition of the second divided print data is the condition in which the resolution is the same as the resolution of the original print data in the sub-scanning direction. Therefore, the CPU 40 divides the ejection information included in the original print data into a set of the ejection information to form the pixel arrays of the rows for which the row numbers in the original print data are multiples of 4, and a set of the ejection information to form all the pixel arrays. The CPU 40 generates the first divided print data configured by the set of the ejection information to form the pixel arrays of the rows for which the row numbers in the original print data are multiples of 4, and generates the second divided print data configured by the set of the ejection information to form all the pixel arrays.

The CPU 40 determines whether or not to set the standby time period (step S64). When the print area is less than 25 cm$^2$, the standby time period is to be set. Therefore the CPU 40 determines that the standby time period is to be set (yes at step S64). The CPU 40 sets the standby time period in the same manner as at step S36 and step S42 shown in FIG. 7 (step S65). The CPU 40 returns the processing to the main processing (refer to FIG. 6). The CPU 40 performs the processing at step S17 to step S24 and prints an image on the fabric.

Based on the first divided print data, only the pixel arrays of the rows for which the row numbers in the original print data are multiples of 4 are formed on the fabric. As a result of this, an image is formed in which the resolution in the sub-scanning direction is ¼ of the resolution in the sub-scanning direction of the image formed by the printing based on the original print data. After the standby time period has elapsed (yes at step S24), all the pixel arrays are formed on the fabric based on the second divided print data. As a result of this, an image is further formed in which the resolution in the sub-scanning direction is the same as the resolution in the sub-scanning direction of the image formed by the printing based on the original print data.

According to the division condition table 110 (refer to FIG. 9), when the print area is equal to or more than 60 cm$^2$, the processing can proceed to the main processing (refer to FIG. 6) without setting the standby time period (no at step S64). According to the division condition table 110, when the print area is less than 60 cm$^2$, the standby time period is set, and when the print area is equal to or more than 60 cm$^2$, the standby time period is not set. More specifically, the CPU 40 determines whether or not to set the standby time period in accordance with the print area calculated at step S61. As described above, the smaller the print area, the greater the possibility that the ink based on the second divided print data may be ejected in a state in which the ink ejected based on the first divided print data has not dried out sufficiently. In a case that the ink ejected based on the first divided print data and the ink ejected adjacent to that based on the second divided print data both dry out while permeating into the record medium and spreading, the color density tends to decrease. Therefore, when the print area is less than 60 cm$^2$, after the standby time period has elapsed from the execution of the print processing based on the first divided print data, the CPU 40 starts the execution of the second print processing based on the second divided print data, and secures the drying time period for the ink. In this manner, the CPU 40 determines whether or not to set the standby time period in accordance with the print area. Thus, the CPU 40 can secure the color density of the printed image and can enhance the print quality.

The resolutions of the first divided print data and the second divided print data are different in accordance with the print area calculated at step S61. More specifically, in accordance with the print area calculated at step S61, the CPU 40 sets whether or not there is overlapping of the divided regions and sets the occupancy rate (step S62 and step S63). Thus, in comparison to a case in which whether or not there is overlapping of the divided regions and the occupancy rate are not set in accordance with the print area, it is possible to secure the color density of the printed image and to enhance the print quality.

In accordance with the print area, the processing to enhance the color density by causing the ink to be ejected in the overlapping manner is combined with the processing to enhance the color density by setting the standby time period. Thus, the CPU 40 can shorten the printing time while securing the print quality.

Based on the division condition table 110, the CPU 40 determines a mode of dividing the print processing in accordance with the print area. However, the CPU 40 may determine the mode of dividing the print processing in accordance with a scan time period or the like, other than the print area.

The scan time period is a time period required for the ejection heads 35 to perform scanning (the relative movement with respect to the platen 39) in order to form all the pixel arrays in the print processing. In the processing at step S61, the CPU 40 simply obtains the print area corresponding to the positions on the pixel arrays onto which the ink is ejected. However, on the pixel arrays, there are also positions onto which the ink is not ejected. Therefore, there are cases in which, even when the print area is relatively small, the print range is wide and it is possible to secure the drying time period for the ink. When the mode of dividing the print processing is determined in accordance with the scan time period, the CPU 40 determines the division condition based on a division condition table 120 shown in FIG. 11, in the divided print data generation processing shown in FIG. 10. The scan time period is obtained in the following manner, for example, by changing part of the processing of the print area calculation processing shown in FIG. 8. At step S52 of the print area calculation processing, based on the ejection information to form a pixel at one end in the main scanning direction of a targeted pixel array and the ejection information to form a pixel at the other end in the main scanning direction of the targeted pixel array, the CPU 40 obtains the number of pixels between the formation positions of both the pixels. Positions on the pixel array onto which the ink is not ejected are also included in the obtained number of pixels. In the same manner as in the print area calculation processing, the CPU 40 obtains a total number of the pixels of all the pixel arrays, and thereafter calculates the scan time period. The print device 30 of the embodiment can form a number A of pixels per second, for example, and after forming pixel arrays of a plurality of rows by one cycle of scanning in the main scanning direction, a number B of seconds is necessary as a time period required to change the movement direction in the reciprocating movement in the main scanning direction of the ejection heads 35. In this case, the CPU 40 obtains the scan time period by adding the number of seconds obtained by dividing the total number of pixels by A, and the number of seconds obtained by multiplying the number of times of changing the movement direction to form all the pixel arrays by B.

Figure 11:
FIG. 11 is a conceptual diagram of a division condition table used to determine division condition in accordance with a scan time period.

As shown in FIG. 11, when the scan time period obtained as described above is less than 15 seconds, the CPU 40 causes the ink to be ejected in the overlapping manner and performs printing based on the mode in which the standby time period is to be set. When the scan time period is equal to or more than 15 seconds and less than 30 seconds, the CPU 40 does not cause the ink to be ejected in the overlapping manner, and performs the print processing based on the mode in which the standby time period is to be set. When the scanning time period is equal to or more than 30 seconds and less than 50 seconds, the CPU 40 causes the ink to be ejected in the overlapping manner, and performs the print processing based on the mode in which no standby time period is to be set. When the scan time period is equal to or more than 50 seconds, the CPU 40 does not cause the ink to be ejected in the overlapping manner, and performs the print processing based on the mode in which no standby time period is to be set. In this manner, the processing to enhance the color density by causing the ink to be ejected in the overlapping manner is combined with the processing to enhance the color density by waiting for a set time to elapse. Thus, the print device 30 can shorten the printing time while securing the print quality.

When the standby time period between the first print processing and the second print processing is set in advance, the CPU 40 may set whether or not there is overlapping of the divided regions and may set the occupancy rate in accordance with the length of the standby time period.

As described above, the carriage 34 of the embodiment is provided with the plurality of ejection heads 35, and is configured such that the four ejection heads 35W and the ejection heads 35C, 35M, 35Y and 35K are disposed so as to be separated from each other in the sub-scanning direction. The print device 30 may use the four ejection heads 35W as first ejection heads 351 that respectively eject the cyan ink, the magenta ink, the yellow ink and the black ink, and use the original ejection heads 35C, 35M, 35Y and 35K as second ejection heads 352. In this case, the CPU 40 generates at least one of the divided print data including information to cause the first ejection heads 351 to perform printing, and the other divided print data including information to cause the second ejection heads 352 to perform printing (step S33, step S34, step S39 and step S40). The CPU 40 may perform printing using the first ejection heads 351 and the second ejection heads 352 based on the information included in each of the divided print data (step S19).

Figure 12:
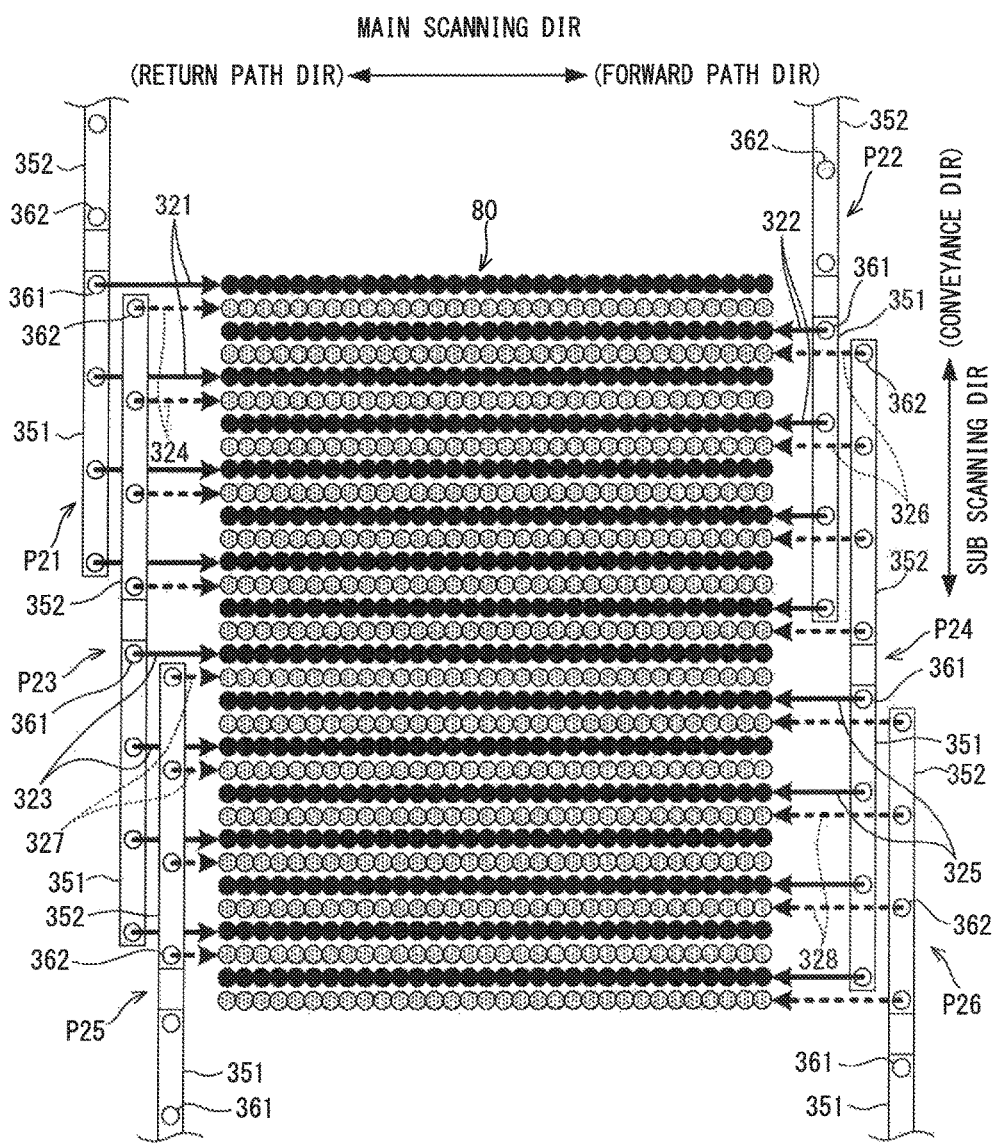
FIG. 12 is an explanatory diagram of print processing that is dividedly performed.

The print processing based on the first divided print data may be performed using the first ejection heads 351 and the print processing based on the second divided print data may be performed using the second ejection heads 352. Print processing according to the present modified example in which the printing is dividedly performed using two ejection heads will be described with reference to FIG. 12. In FIG. 12, in order to simplify the drawing and description, an example of the print processing will be described that is performed at a lower resolution than an actual resolution using the single first ejection head 351 and the single second ejection head 352, in which ejection openings 361 and 362 of a smaller number than an actual number are respectively illustrated. In the description below, as an example, an image is printed using the first divided print data and the second divided print data obtained by dividing the original print data such that their resolutions in the sub-scanning direction are each half the resolution of the original print data. In the case of the present modified example, the CPU 40 generates the first divided print data including information to cause the first ejection head 351 to perform printing, and the second divided print data including information to cause the second ejection head 352 to perform printing (step S33, step S34, step S39 and step S40).

The CPU 40 performs printing based on the information included in each of the divided print data (step S19). More specifically, the print device 30 ejects the ink from the ejection openings 361 of the first ejection head 351 in accordance with the first divided print data while moving the first ejection head 351 and the second ejection head 352 in the forward path direction, and forms first pixel arrays 321 that correspond to the pixel arrays of the first row, the fifth row, the ninth row and the thirteenth row in the original print data (P21). When the formation of the first pixel arrays 321 is complete, the print device 30 moves the platen 39 in the conveyance direction by two pixels. The print device 30 ejects the ink from the ejection openings 361 in accordance with the first divided print data while moving the first ejection head 351 and the second ejection head 352 in the return path direction, and forms second pixel arrays 322 that correspond to the pixel arrays of the third row, the seventh row, the eleventh row and the fifteenth row in the original print data (P22).

The print device 30 moves the platen 39 in the conveyance direction by a length of the first ejection head 351. The print device 30 ejects the ink from the ejection openings 361 in accordance with the first divided print data while moving the first ejection head 351 and the second ejection head 352 in the forward path direction, and forms third pixel arrays 323 that correspond to the pixel arrays of the seventeenth row, the twenty-first row, the twenty-fifth row and the twenty-ninth row in the original print data (P23). At the same time, the print device 30 ejects the ink from the ejection openings 362 of the second ejection head 352 in accordance with the second divided print data, and forms fourth pixel arrays 324 that correspond to the pixel arrays of the second row, the sixth row, the tenth row and the fourteenth row in the original print data (P23). Each of the fourth pixel arrays 324 is formed between the first pixel array 321 and the second pixel array 322. The print device 30 moves the platen 39 in the conveyance direction by two pixels. The print device 30 ejects the ink from the ejection openings 361 in accordance with the first divided print data while moving the first ejection head 351 and the second ejection head 352 in the return path direction, and forms fifth pixel arrays 325 that correspond to the pixel arrays of the nineteenth row, the twenty-third row, the twenty-seventh row and the thirty-first row in the original print data (P24). At the same time, the print device 30 ejects the ink from the ejection openings 362 of the second ejection head 352 in accordance with the second divided print data, and forms sixth pixel arrays 326 that correspond to the pixel arrays of the fourth row, the eighth row, the twelfth row and the sixteenth row in the original print data (P24). Each of the sixth pixel arrays 326 is formed between the second pixel array 322 and the first pixel array 321.

The print device 30 moves the platen 39 in the conveyance direction by the length of the first ejection head 351. The print device 30 ejects the ink from the ejection openings 362 in accordance with the second divided print data while moving the first ejection head 351 and the second ejection head 352 in the forward path direction, and forms seventh pixel arrays 327 that correspond to the pixel arrays of the eighteenth row, the twenty-second row, the twenty-sixth row and the thirtieth row in the original print data (P25). Each of the seventh pixel arrays 327 is formed between the third pixel array 323 and the fifth pixel array 325. The print device 30 moves the platen 39 in the conveyance direction by two pixels. The print device 30 ejects the ink from the ejection openings 362 in accordance with the second divided print data while moving the first ejection head 351 and the second ejection head 352 in the return path direction, and forms eighth pixel arrays 328 that correspond to the pixel arrays of the twentieth row, the twenty-fourth row, the twenty-eighth row and the thirty-second row in the original print data (P26). Each of the eighth pixel arrays 328 is formed between the fifth pixel array 325 and the third pixel array 323.

In this manner, the print device 30 ejects the ink from the ejection openings 361 of the first ejection head 351 in accordance with the first divided print data, and forms the first pixel arrays 321, the second pixel arrays 322, the third pixel arrays 323 and the fifth pixel arrays 325. The print device 30 ejects the ink from the ejection openings 362 of the second ejection head 352 in accordance with the second divided print data, and forms the fourth pixel arrays 324, the sixth pixel arrays 326, the seventh pixel arrays 327 and the eighth pixel arrays 328. Gaps between the first pixel arrays 321, the second pixel arrays 322, the third pixel arrays 323 and the fifth pixel arrays 325 are filled by the fourth pixel arrays 324, the sixth pixel arrays 326, the seventh pixel arrays 327 and the eighth pixel arrays 328, and an image formed by the plurality of pixel arrays is printed on the fabric.

In this manner, the print device 30 can perform the print processing based on the first divided print data and the print processing based on the second divided print data by ejecting the ink from the different ejection openings 361 and 362, respectively. Thus, the print device 30 can obtain effects of the divided printing similar to those of the embodiment, by performing the printing based on the different divided print data using the two ejection heads (the first ejection head 351 and the second ejection head 352). The print device 30 can reduce the number of times of movement of the fabric in the conveyance direction, and can shorten the printing time. When the number of divisions is two as in the present modified example, the print device 30 can form all the pixel arrays simply by relatively moving the first ejection head 351 and the second ejection head 352 once in the sub-scanning direction.

A computer-readable medium storing programs, such as the above-described main program, need not necessarily include a signal that is transmitted temporarily. The computer-readable medium may be a non-transitory storage medium that does not include a transitory signal. It is sufficient if the non-transitory storage medium can store information regardless of a period during which information is stored. Examples of the non-transitory storage medium include a memory card, a flexible disk, a DVD, a CD-ROM, a hard disk and the like. Further, each of the above-described processing is not limited to the example performed by the CPUs 10 and 40, and may be performed by an electronic component (an ASIC, for example) that is different from the CPUs 10 and 40. Further, each of the above-described processing may be performed through distributed processing by a plurality of electronic components (a plurality of CPUs, for example). More specifically, for example, a part of the above-described main program may be executed by the CPU 10 and the remaining part of the main program may be executed by the CPU 40.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A print data generation apparatus configured to generate print data to be used in a print device, the print device being configured to print a print image in a predetermined original region on a record medium by causing an ejection head having a plurality of ejection openings each configured to eject a liquid droplet to perform scanning relative to the record medium in a first direction and a second direction intersecting the first direction, the print data generation apparatus comprising:

a processor; and
a memory storing computer-readable instructions which, when executed by the processor, perform processes comprising:
acquiring original print data including ejection information corresponding to the original region, the ejection information being information to cause the liquid droplet to be ejected from each of the plurality of ejection openings in order to form each of a plurality of pixels forming the print image, the original print data including the ejection information to form a plurality of pixel arrays aligned in the second direction, and each of the pixel arrays being an array of the pixels arranged in the first direction; and
generating, based on the ejection information included in the acquired original print data, a plurality of divided print data to print the print image by performing a plurality of a set of scans in the first direction and the second direction, the set of scans corresponding to a whole of the original region, the plurality of divided print data including a first divided print data and a second divided print data, the first divided print data including the ejection information to form a first pixel array and a second pixel array and not including the ejection information to form a third pixel array, the second pixel array being included in the plurality of pixel arrays aligned in the second direction corresponding to the original print data, and being the pixel array not adjacent to the first pixel array in the second direction, and the third pixel array being included in the plurality of pixel arrays aligned in the second direction corresponding to the original print data, and being the pixel array between the first pixel array and the second pixel array in the second direction and adjacent to the first pixel array, the second divided print data including the ejection information to form the third pixel array and not including the ejection information to form the first pixel array and the second pixel array, the first divided print data including the ejection information that moves, after forming the first pixel array, a platen relative to the ejection head to a conveyance direction in the second direction to form the second pixel array, the second divided print data including the ejection information that moves, after forming the second pixel array, the platen relative to the ejection head to a direction opposite to the conveyance direction in the second direction to form the third pixel array on an area to which the liquid droplet is not applied.

2. The print data generation apparatus according to claim 1, wherein the generating includes generating m pieces of the divided print data satisfying a following equation, $$N = m \times n + (i - m)$$

where N is an integer representing an ordinal number in the second direction of each of the plurality of pixel arrays aligned in the second direction corresponding to the original print data, m is an integer representing a number of divisions, n is an integer representing an ordinal number in the second direction of each of the plurality of pixel arrays aligned in the second direction corresponding to the divided print data, and i is an integer from one to m.

3. The print data generation apparatus according to claim 2, wherein
the generating includes generating the plurality of divided print data generated in a manner that a resolution of the print image to be formed based on the original print data, is an integer multiple of a resolution of a divided image to be formed based on each of the divided print data, and that the resolution of the divided image is an integer multiple of a resolution of an array of the ejection openings in the ejection head.

4. The print data generation apparatus according to claim 1, wherein
the first direction is a direction orthogonal to the conveyance direction in which the record medium is conveyed by a conveyance mechanism provided in the print device, and the second direction is the conveyance direction.

5. The print data generation apparatus according to claim 1, wherein
the generating includes execution of first generation processing, the first generation processing generating the plurality of divided print data in a manner that an occupancy rate for each of the divided print data is less than one hundred percent and a total value of the occupancy rates for all the divided print data is one hundred percent, the occupancy rate being a percentage of a number of the pixel arrays within a divided region with respect to a number of the pixel arrays within the original region, and the divided region being a region within the original region in which the pixel arrays are formed based on each of the divided print data.

6. The print data generation apparatus according to claim 5, wherein
the computer-readable instructions, when executed by the processor, further perform a process comprising:
receiving a command to perform one of the first generation processing and second generation processing, the second generation processing being processing to generate the plurality of divided print data in a manner that the occupancy rate for each of all the divided print data is equal to or less than one hundred percent, the occupancy rate for at least one of the divided print data is less than one hundred percent, and a total value of the occupancy rates for all the divided print data is more than one hundred percent, and
the generating includes performing one of the first generation processing and the second generation processing indicated by the received command.

7. The print data generation apparatus according to claim 5, wherein
the computer-readable instructions, when executed by the processor, further perform processes comprising:
calculating an area of the print image to be printed on the record medium, based on the ejection information included in the original print data; and
setting whether there is overlapping of the divided regions and setting the occupancy rate, for each of the divided print data, in accordance with the calculated area.

8. The print data generation apparatus according to claim 1, wherein
the generating includes generating the plurality of divided print data in a manner that an occupancy rate for each of all the divided print data is equal to or less than one hundred percent, the occupancy rate for at least one of the divided print data is less than one hundred percent, and a total value of the occupancy rates for all the divided print data is more than one hundred percent, the occupancy rate being a percentage of a number of the pixel arrays within a divided region with respect to a number of the pixel arrays within the original region, and the divided region being a region within the original region in which the pixel arrays are formed based on each of the divided print data.

9. The print data generation apparatus according to claim 8, wherein
the computer-readable instructions, when executed by the processor, further perform processes comprising:
calculating an area of the print image to be printed on the record medium, based on the ejection information included in the original print data; and
setting whether there is overlapping of the divided regions and setting the occupancy rate, for each of the divided print data, in accordance with the calculated area.

10. The print data generation apparatus according to claim 1, wherein
the ejection head includes a first ejection head and a second ejection head each having the plurality of ejection openings, and
the generating includes generating at least one of the divided print data including information to cause the first ejection head to perform printing, and another of the divided print data including information to cause the second ejection head to perform printing.

11. The print data generation apparatus according to claim 1, wherein
the computer-readable instructions, when executed by the processor, further perform a process comprising:
setting, when the print device is caused to perform first print processing based on one of the plurality of generated divided print data and thereafter the print device is caused to perform second print processing based on another of the plurality of divided print data, a standby time period from when the print device completes the first print processing to when the print device starts the second print processing.

12. The print data generation apparatus according to claim 11, wherein
the standby time period is set in a manner that an interval from when the print device starts the first print processing to when the print device starts the second print processing is a predetermined time period.

13. The print data generation apparatus according to claim 11, wherein
the computer-readable instructions, when executed by the processor, further perform processes comprising:

calculating an area of the print image to be printed on the record medium, based on the ejection information included in the original print data; and setting whether there is the standby time period in accordance with the calculated area.

14. The print data generation apparatus according to claim 11, wherein
the computer-readable instructions, when executed by the processor, further perform a process comprising:
receiving a command as to whether to set the standby time period.

15. The print data generation apparatus according to claim 1, wherein
the computer-readable instructions, when executed by the processor, further perform processes comprising:
causing, after the print device is caused to perform first print processing based on one of the plurality of generated divided print data, the ejection head to perform a first relative movement with respect to the record medium in a manner that a relative position of the ejection head with respect to the record medium is a start position, the start position being a position of the ejection head at a time point of starting the first print processing; and
causing, after the first relative movement, the print device to perform second print processing based on another of the plurality of divided print data while causing the ejection head to perform a second relative movement in the second direction with respect to the record medium, the other of the plurality of divided print data including the third pixel array.

16. A print data generation method capable of generating print data to be used in a print device configured to print a print image in a predetermined original region on a record medium by causing an ejection head having a plurality of ejection openings each configured to eject a liquid droplet to perform scanning relative to the record medium in a first direction and a second direction intersecting the first direction, the print data generation method comprising steps of:
acquiring original print data including ejection information corresponding to the original region, the ejection information being information to cause the liquid droplet to be ejected from each of the plurality of ejection openings in order to form each of a plurality of pixels forming the print image, the original print data including the ejection information to form a plurality of pixel arrays aligned in the second direction, and each of the pixel arrays being an array of the pixels arranged in the first direction; and
generating, based on the ejection information included in the acquired original print data, a plurality of divided print data to print the print image by performing a plurality of a set of scans in the first direction and the second direction, the set of scans corresponding to a whole of the original region, the plurality of divided print data including a first divided print data and a second divided print data, the first divided print data including the ejection information to form a first pixel array and a second pixel array and not including the ejection information to form a third pixel array, the second pixel array being included in the plurality of pixel arrays aligned in the second direction corresponding to the original print data, and being the pixel array not adjacent to the first pixel array in the second direction, and the third pixel array being included in the plurality of pixel arrays aligned in the second direction corresponding to the original print data, and being the pixel array between the first pixel array and the second pixel array in the second direction and adjacent to the first pixel array, the second divided print data including the ejection information to form the third pixel array and not including the ejection information to form the first pixel array and the second pixel array, the first divided print data including the ejection information that moves, after forming the first pixel array, a platen relative to the conveyance direction in the second direction to form the second pixel array, the second divided print data including the ejection information that moves, after forming the second pixel array, the platen relative to the ejection head to a direction opposite to the conveyance direction in the second direction to form the third pixel array on an area to which the liquid droplet is not applied.

17. A non-transitory computer-readable medium storing computer readable instructions which, when executed by a processor provided in a print data generation apparatus configured to generate print data to be used in a print device configured to print a print image in a predetermined original region on a record medium by causing an ejection head having a plurality of ejection openings each configured to eject a liquid droplet to perform scanning relative to the record medium in a first direction and a second direction intersecting the first direction, perform processes comprising:
acquiring original print data including ejection information corresponding to the original region, the ejection information being information to cause the liquid droplet to be ejected from each of the plurality of ejection openings in order to form each of a plurality of pixels forming the print image, the original print data including the ejection information to form a plurality of pixel arrays aligned in the second direction, and each of the pixel arrays being an array of the pixels arranged in the first direction; and
generating, based on the ejection information included in the acquired original print data, a plurality of divided print data to print the print image by performing a plurality of a set of scans in the first direction and the second direction, the set of scans corresponding to a whole of the original region, the plurality of divided print data including a first divided print data and a second divided print data, the first divided print data including the ejection information to form a first pixel array and a second pixel array and not including the ejection information to form a third pixel array, the second pixel array being included in the plurality of pixel arrays aligned in the second direction corresponding to the original print data, and being the pixel array not adjacent to the first pixel array in the second direction, and the third pixel array being included in the plurality of pixel arrays aligned in the second direction corresponding to the original print data, and being the pixel array between the first pixel array and the second pixel array in the second direction and adjacent to the first pixel array, the second divided print data including the ejection information to form the third pixel array and not including the ejection information to form the first pixel array and the second pixel array, the first divided print data including the ejection information that moves, after forming the first pixel array, a platen relative to the conveyance direction in the second direction to form the second pixel array, the second divided print data including the ejection information that moves, after forming the second pixel array, the platen relative to the ejection head to a direction opposite to the conveyance direction in the second direction to form the third pixel array on an area to which the liquid droplet is not applied.

18. A print device configured to print a print image in a predetermined original region on a record medium by causing an ejection head having a plurality of ejection openings each configured to eject a liquid droplet to perform scanning relative to the record medium in a first direction and a second direction intersecting the first direction, the print device comprising:
a processor; and
a memory storing computer-readable instructions which, when executed by the processor, perform processes comprising:
original print data acquiring processing acquiring original print data including ejection information corresponding to the original region, the ejection information being information to cause the liquid droplet to be ejected from each of the plurality of ejection openings in order to form each of a plurality of pixels forming the print image, the original print data including the ejection information to form a plurality of pixel arrays aligned in the second direction, and each of the pixel arrays being an array of the pixels arranged in the first direction;
print data generating processing generating, based on the ejection information included in the acquired original print data, a plurality of divided print data to print the print image by performing a plurality of a set of scans in the first direction and the second direction, the set of scans corresponding to a whole of the original region, the plurality of divided print data including a first divided print data and a second divided print data, the first divided print data including the ejection information to form a first pixel array and a second pixel array and not including the ejection information to form a third pixel array, the second pixel array being included in the plurality of pixel arrays aligned in the second direction corresponding to the original print data, and being the pixel array not adjacent to the first pixel array in the second direction, and the third pixel array being included in the plurality of pixel arrays aligned in the second direction corresponding to the original print data, and being the pixel array between the first pixel array and the second pixel array in the second direction and adjacent to the first pixel array, the second divided print data including the ejection information to form the third pixel array and not including the ejection information to form the first pixel array and the second pixel array, the first divided print data including the ejection information that moves, after forming the first pixel array, a platen relative to the conveyance direction in the second direction to form the second pixel array, the second divided print data including the ejection information that moves, after forming the second pixel array, the platen relative to the ejection head to a direction opposite to the conveyance direction in the second direction to form the third pixel array on an area to which the liquid droplet is not applied;
first forming processing forming the first pixel array based on the ejection information included in the generated first divided print data;
first moving processing moving, after the first forming processing, the platen relative to the ejection head to the conveyance direction based on the ejection information included in the generated first divided print data;
second forming processing forming, after the first moving processing, the second pixel array based on the ejection information included in the generated first divided print data;
second moving processing moving, after the second forming processing, the platen relative to the ejection head to the direction opposite to the conveyance direction based on the ejection information included in the generated second divided print data; and
third forming processing forming, after the second moving processing, the third pixel array based on the ejection information included in the generated second divided print data, the third pixel array being formed on the area to which the liquid droplet is not applied.

* * * * *